US011003978B2

(12) United States Patent
Khoche

(10) Patent No.: US 11,003,978 B2
(45) Date of Patent: May 11, 2021

(54) PROGRAMMABLE NETWORK NODE ROLES IN HIERARCHICAL COMMUNICATIONS NETWORK

(71) Applicant: Ajay Khoche, West San Jose, CA (US)

(72) Inventor: Ajay Khoche, West San Jose, CA (US)

( * ) Notice: Subject to any disclaimer, the term of this patent is extended or adjusted under 35 U.S.C. 154(b) by 0 days.

(21) Appl. No.: 16/541,160

(22) Filed: Aug. 15, 2019

(65) Prior Publication Data

US 2019/0370624 A1 Dec. 5, 2019

Related U.S. Application Data

(63) Continuation-in-part of application No. 16/517,508, filed on Jul. 19, 2019, and a continuation-in-part of application No. 16/430,929, filed on Jun. 4, 2019, now Pat. No. 10,885,420, and a continuation-in-part of application No. 16/409,589, filed on May 10, 2019, now Pat. No. 10,902,310, and a continuation-in-part
(Continued)

(51) Int. Cl.
| | |
|---|---|
| *G06K 19/077* | (2006.01) |
| *H04W 4/80* | (2018.01) |
| *H04W 84/20* | (2009.01) |
| *B65C 9/18* | (2006.01) |
| *B65C 9/00* | (2006.01) |

(52) U.S. Cl.
CPC ........ *G06K 19/0776* (2013.01); *B65C 9/1869* (2013.01); *G06K 19/07718* (2013.01); *H04W 4/80* (2018.02); *H04W 84/20* (2013.01); *B65C 2009/0003* (2013.01)

(58) Field of Classification Search
CPC ........ G06K 19/0776; G06K 19/07718; H04W 4/80; H04W 84/20; H04W 4/35; H04W 4/33; H04W 4/38; B65C 9/1869; B65C 2009/0003
See application file for complete search history.

(56) References Cited

U.S. PATENT DOCUMENTS 6,614,392 B2 9/2003 Howard
9,182,231 B2 11/2015 Skaaksrud
(Continued)

FOREIGN PATENT DOCUMENTS

JP 2008239282 A 10/2008

OTHER PUBLICATIONS

Chong Shen et al., "A mobility framework to improve heterogeneous wireless network services,"Inderscience Enterprises Ltd., 2011.
(Continued)

*Primary Examiner* — Seung H Lee

(57) ABSTRACT

The disclosure features a method of creating a communications network. In this method, a first tape node includes a first type of wireless communication interface and a second type of wireless communication interface having a longer range than the first type of wireless communication interface. A second tape node includes the first type of wireless communication interface that is operable to communicate with the first tape node over a wireless communication connection established between the first type of wireless communication interfaces of the first and second tape nodes. Over a wireless communication connection, the first tape node sends programmatic code executable by the first tape node to function as a master tape node with respect to the second tape node.

19 Claims, 10 Drawing Sheets

Related U.S. Application Data of application No. 15/842,867, filed on Dec. 14, 2017, now Pat. No. 10,445,634, and a continuation-in-part of application No. 15/842,840, filed on Dec. 14, 2017, now Pat. No. 10,482,369.

(60) Provisional application No. 62/764,839, filed on Aug. 16, 2018, provisional application No. 62/701,608, filed on Jul. 20, 2018, provisional application No. 62/680,716, filed on Jun. 5, 2018, provisional application No. 62/670,712, filed on May 11, 2018, provisional application No. 62/435,207, filed on Dec. 16, 2016, provisional application No. 62/434,218, filed on Dec. 14, 2016.

(56) References Cited

U.S. PATENT DOCUMENTS

| | | |
|---|---|---|
| 9,189,226 B2 | 11/2015 | Driesen et al. |
| 9,824,329 B2 | 11/2017 | Stirling et al. |
| 9,860,688 B2 | 1/2018 | Kulkarni et al. |
| 2003/0018927 A1 | 1/2003 | Gadir et al. |
| 2007/0049291 A1 | 3/2007 | Kim et al. |
| 2008/0239282 A1 | 10/2008 | Zou et al. |
| 2010/0082870 A1 | 4/2010 | Tokuhara |
| 2010/0299401 A1 | 11/2010 | Lloyd |
| 2013/0107770 A1 | 5/2013 | Marsden et al. |
| 2015/0154531 A1 | 6/2015 | Skaaksrud |
| 2016/0233927 A1 | 8/2016 | Wu |
| 2017/0039666 A1 | 2/2017 | Kuersten et al. |
| 2018/0046964 A1 | 2/2018 | Leoni et al. |
| 2018/0165568 A1 | 6/2018 | Khoche |

OTHER PUBLICATIONS

International Search Report, International application No. PCT/US2019/042488, International Filing Date Jul. 18, 2019, Transmittal Date Nov. 5, 2019.

International Search Report, International application No. PCT/US2019/046588, International filing date: Aug. 15, 2019, earliest priority date: Aug. 16, 2018.

Lucas Iacono, Wireless Sensor Network Protocols, Universidad De Mendoza, Argentina, 2011.

M.A. Matin et al., Overview of Wireless Sensor Network, Intech, 2012 (http://dx.doi.org/10.5772/49376.1).

Mario G. C. Cimino et al., "Wireless communication, identification, and sensing technologies enabling integrated logistics: a study in the harbor environment," Research Gate, Oct. 2015 (https://www.researchgate.net/publication/283117890_Wireless_communication_identification_and_sensing_technologies_enabling_integrated_logistics_a_study_in_the_harbor_environment).

Notification of Transmittal of the International Search Report and the Written Opinion of the International Searching Authority, or the Declaration, International application No. PCT/US2019/046588, International Filing Date Aug. 15, 2019, dated Jan. 6, 2020.

Written Opinion of the International Searching Authority, International application No. PCT/US2019/042488, International Filing Date Jul. 18, 2019, dated Nov. 5, 2019.

Written Opinion of the International Searching Authority, International application No. PCT/US2019/046588, International filing date Aug. 15, 2019, Priority Date: Aug. 16, 2018.

PCT, International Preliminary Report on Patentability, dated Feb. 16, 2021, 7 pgs, Geneva, Switzerland.

PROGRAMMABLE NETWORK NODE ROLES IN HIERARCHICAL COMMUNICATIONS NETWORK

FIELD OF THE DISCLOSURE

The disclosure generally relates to logistics and more particularly to asset management, including packaging, tracking, warehousing, inventorying, and monitoring items (e.g., objects, parcels, persons, tools and other equipment).

BACKGROUND

This application relates in particular to power efficient hierarchical logistics platforms.

SUMMARY

This specification describes a low-cost, multi-function wireless tape system with a form factor that unobtrusively integrates the components needed to implement a combination of different logistic functions and also is able to perform a useful ancillary function that otherwise would have to be performed with the attendant need for additional materials, labor, and expense.

In an aspect, a wireless communication device includes an antenna, a wireless communication system, a processor coupled to the wireless communication system, an energy source, a one-time wake circuit that can be awoken only one time and thereby create a persistent unimpeded connection between the energy source and each of the processor and the wireless communication system, and at least one non-transitory processor readable medium comprising programmatic code which, when executed by the processor, configures the processor to perform operations comprising controlling the wireless communication system to communicate wireless messages with one or more other network nodes during respective communication windows specified in the processor readable medium.

Another aspect relates to a wireless communication method. In accordance this method, responsive to an event, a one-time wake circuit of a wireless communication device comprising and antenna, a wireless communication system, and energy source is woken. Responsive to the waking, a persistent electrical connection is created between the energy source and each of the processor and the wireless communication system. The processor executes programmatic code stored on at least one non-transitory processor readable medium component of the wireless communication device to perform operations comprising controlling the wireless communication system to communicate wireless messages with one or more other network nodes during respective communication windows specified in the processor readable medium.

In another aspect, a method of creating a hierarchical communications network is described. The method includes adhering a first tape node to a first parcel in a set of associated parcels. The first tape node includes a first type of wireless communication interface and a second type of wireless communication interface having a longer range than the first type of wireless communication interface. A second tape node is adhered to a second parcel in the set. The second tape node includes the first type of wireless communication interface. The second tape node is operable to communicate with the first tape node over a wireless communication connection established between the first type of wireless communication interfaces of the first and second tape nodes. The method further includes establishing, by an application executing on a computer system, a wireless communication connection with the second type of wireless communication interface of the first tape node, and transmitting, by the application, programmatic code executable by the first tape node to function as a master tape node with respect to the second tape node.

In another aspect, a hierarchical communications network is described. The hierarchical communications network includes a first tape node adhered to a first parcel in a set of associated parcels, the first tape node including a first type of wireless communication interface and a second type of wireless communication interface having a longer range than the first type of wireless communication interface. A second tape node is adhered to a second parcel in the set and includes the first type of wireless communication interface, where the second tape node is operable to communicate with the first tape node over a wireless communication connection established between the first type of wireless communication interfaces of the first and second tape nodes. A computer system is operable to execute an application to perform functions comprising establishing a wireless communication connection with the second type of wireless communication interface of the first tape node, and designating, by the application, the first tape node as a master tape node with respect to the second tape node.

A method of creating a hierarchical communications network also is described. The method includes activating a first tape node and adhering it to a first parcel in a set of associated parcels, the first tape node comprising a first type of wireless communication interface and a second type of wireless communication interface having a longer range than the first type of wireless communication interface. The method also includes activating second and third tape nodes and respectively adhering them to second and third parcels in the set of associated parcels. Each of the second and third tape nodes includes the first type of wireless communication interface and a respective sensor. Each of the second and third tape nodes also is operable to communicate with the first tape node over a wireless communication connection established between the first type of wireless communication interfaces of the first, second, and third tape nodes. An application executing on a computer system transmits to each of the second and third tape node programmatic code for detecting and responding to an event.

Embodiments of the subject matter described in this specification include methods, processes, systems, apparatus, and tangible non-transitory carrier media encoded with one or more program instructions for carrying out one or more methods and processes for enabling the various functionalities of the described systems and apparatus.

Other features, aspects, objects, and advantages of the subject matter described in this specification will become apparent from the description, the drawings, and the claims.

DETAILED DESCRIPTION

I. Introduction

Figure 1A:
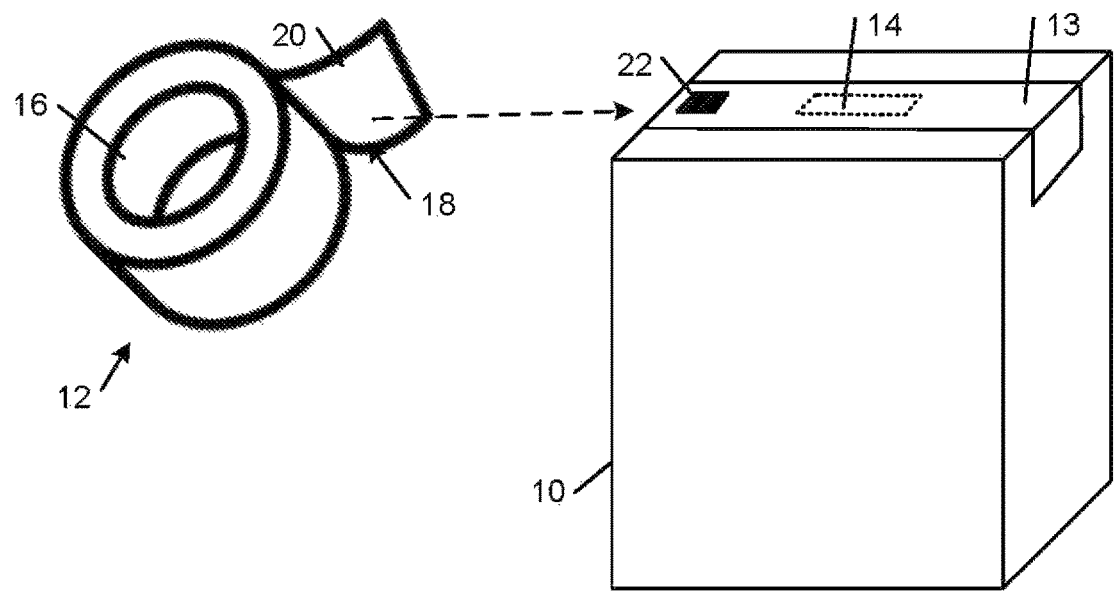
FIG. 1A is a diagrammatic view of a package that has been sealed for shipment using a segment of an example adhesive tape platform dispensed from a roll.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

As used herein, the term "or" refers an inclusive "or" rather than an exclusive "or." In addition, the articles "a" and "an" as used in the specification and claims mean "one or more" unless specified otherwise or clear from the context to refer the singular form.

The term "tape node" refers to an adhesive tape platform or a segment thereof that is equipped with sensor, processor, memory, energy source/harvesting mechanism, and wireless communications functionality, where the adhesive product has a variety of different form factors, including a multilayer roll or a sheet that includes a plurality of divisible adhesive segments. Once deployed, each tape node can function, for example, as an adhesive tape, label, sticker, decal, or the like, and as a wireless communications device. A "peripheral" tape node (also referred to as an "outer" node, a "leaf" node, and "terminal" node) refers to a tape node that does not have any child nodes.

In certain contexts, the terms "parcel," "envelope," "box," "package," "container," "pallet," "carton," "wrapping," and the like are used interchangeably herein to refer to a packaged item or items.

This specification describes a low-cost, multi-function adhesive tape platform with a form factor that unobtrusively integrates the components useful for implementing a combination of different logistic functions and also is able to perform a useful ancillary function that otherwise would have to be performed with the attendant need for additional materials, labor, and expense. In an aspect, the adhesive tape platform is implemented as a collection of adhesive products that integrate wireless communications and sensing components within a flexible adhesive structure in a way that not only provides a cost-effective platform for interconnecting, optimizing, and protecting the components of the tracking system but also maintains the flexibility needed to function as an adhesive product that can be deployed seamlessly and unobtrusively into various logistic applications and workflows, including person and object tracking applications, and asset management workflows such as manufacturing, storage, shipping, delivery, and other logistics associated with moving products and other physical objects, including logistics, sensing, tracking, locationing, warehousing, parking, safety, construction, event detection, road management and infrastructure, security, and healthcare. In some examples, the adhesive tape platforms are used in various aspects of logistics management, including sealing parcels, transporting parcels, tracking parcels, monitoring the conditions of parcels, inventorying parcels, and verifying package security. In these examples, the sealed parcels typically are transported from one location to another by truck, train, ship, or aircraft or within premises, e.g., warehouses by forklift, trolleys etc.

In disclosed examples, an adhesive tape platform includes a plurality of segments that can be separated from the adhesive product (e.g., by cutting, tearing, peeling, or the like) and adhesively attached to a variety of different surfaces to inconspicuously implement any of a wide variety of different wireless communications based network communications and transducing (e.g., sensing, actuating, etc.) applications. Examples of such applications include: event detection applications, monitoring applications, security applications, notification applications, and tracking applications, including inventory tracking, package tracking, person tracking, animal (e.g., pet) tracking, manufactured parts tracking, and vehicle tracking. In example embodiments, each segment of an adhesive tape platform is equipped with an energy source, wireless communication functionality, transducing functionality, and processing functionality that enable the segment to perform one or more transducing functions and report the results to a remote server or other computer system directly or through a network of tapes. The components of the adhesive tape platform are encapsulated within a flexible adhesive structure that protects the components from damage while maintaining the flexibility needed to function as an adhesive tape (e.g., duct tape or a label) for use in various applications and workflows. In addition to single function applications, example embodiments also include multiple transducers (e.g., sensing and/or actuating transducers) that extend the utility of the platform by, for example, providing supplemental information and functionality relating characteristics of the state and or environment of, for example, an article, object, vehicle, or person, over time.

Systems and processes for fabricating flexible multifunction adhesive tape platforms in efficient and low-cost ways also are described. In addition to using roll-to-roll and/or sheet-to-sheet manufacturing techniques, the fabrication systems and processes are configured to optimize the placement and integration of components within the flexible adhesive structure to achieve high flexibility and ruggedness. These fabrication systems and processes are able to create useful and reliable adhesive tape platforms that can provide local sensing, wireless transmitting, and locationing functionalities. Such functionality together with the low cost of production is expected to encourage the ubiquitous deployment of adhesive tape platform segments and thereby alleviate at least some of the problems arising from gaps in conventional infrastructure coverage that prevent continuous monitoring, event detection, security, tracking, and other logistics applications across heterogeneous environments.

II. Adhesive Tape Platform

FIG. 1A shows an example package 10 that is sealed for shipment using an example adhesive tape platform 12 that includes embedded components of a wireless transducing circuit 14 (collectively referred to herein as a "tape node"). In this example, a length 13 of the adhesive tape platform 12 is dispensed from a roll 16 and affixed to the package 10. The adhesive tape platform 12 includes an adhesive side 18 and a non-adhesive side 20. The adhesive tape platform 12 can be dispensed from the roll 16 in the same way as any conventional packing tape, shipping tape, or duct tape. For example, the adhesive tape platform 12 may be dispensed from the roll 16 by hand, laid across the seam where the two top flaps of the package 10 meet, and cut to a suitable length either by hand or using a cutting instrument (e.g., scissors or an automated or manual tape dispenser). Examples of such tapes include tapes having non-adhesive sides 20 that carry one or more coatings or layers (e.g., colored, light reflective, light absorbing, and/or light emitting coatings or layers).

Figure 1B:
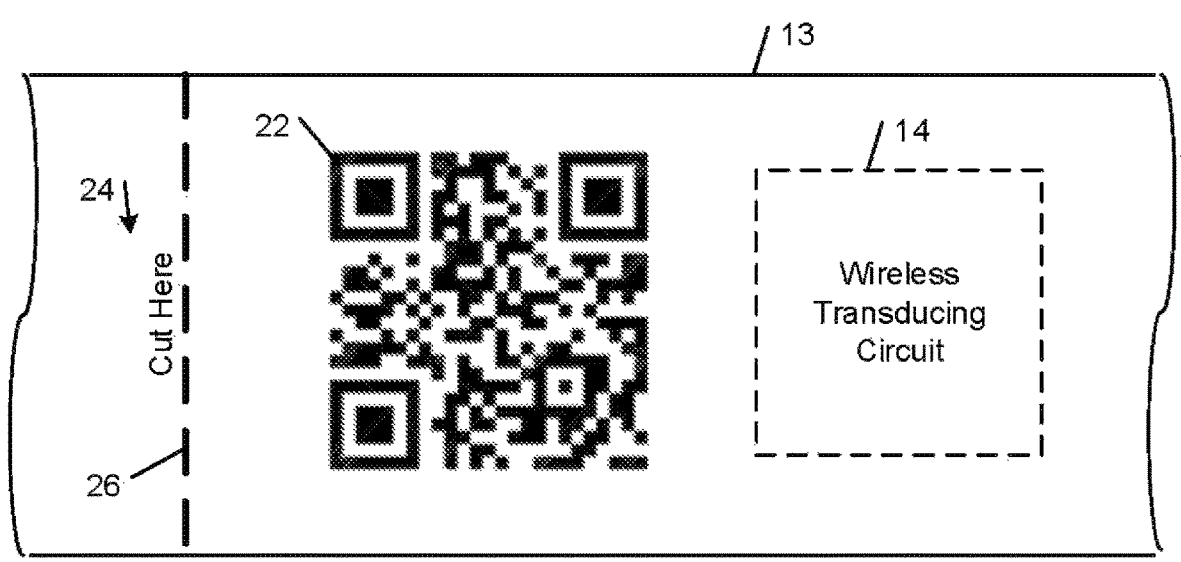
FIG. 1B is a diagrammatic top view of a portion of the segment of the example adhesive tape platform shown in FIG. 1A.

Referring to FIG. 1B, in some examples, the non-adhesive side 20 of the length 13 of the adhesive tape platform 12 includes writing or other markings that convey instructions, warnings, or other information to a person or machine (e.g., a bar code reader), or may simply be decorative and/or entertaining. For example, different types of adhesive tape platforms may be marked with distinctive colorations to distinguish one type of adhesive tape platform from another. In the illustrated example, the length 13 of the adhesive tape platform 12 includes a two-dimensional bar code (e.g., a QR Code) 22, written instructions 24 (i.e., "Cut Here"), and an associated cut line 26 that indicates where the user should cut the adhesive tape platform 12. The written instructions 24 and the cut line 26 typically are printed or otherwise marked on the top non-adhesive surface 20 of the adhesive tape platform 12 during manufacture. The two-dimensional bar code 22, on the other hand, may be marked on the non-adhesive surface 20 of the adhesive tape platform 12 during the manufacture of the adhesive product 12 or, alternatively, may be marked on the non-adhesive surface 20 of the adhesive tape platform 12 as needed using, for example, a printer or other marking device.

In order to avoid damage to the functionality of the segments of the adhesive tape platform 12, the cut lines 26 typically demarcate the boundaries between adjacent segments at locations that are free of any active components of the wireless transducing circuit 14. The spacing between the wireless transducing circuit components 14 and the cut lines 26 may vary depending on the intended communication, transducing and/or adhesive taping application. In the example illustrated in FIG. 1A, the length of the adhesive tape platform 12 that is dispensed to seal the package 10 corresponds to a single segment of the adhesive tape platform 12. In other examples, the length of the adhesive tape platform 12 needed to seal a package or otherwise serve the adhesive function for which the adhesive tape platform 12 is being applied may include multiple segments 13 of the adhesive tape platform 12, one or more of which segments 13 may be activated upon cutting the length of the adhesive tape platform 12 from the roll 16 and/or applying the length of the adhesive tape platform to the package 10.

In some examples, the transducing components 14 that are embedded in one or more segments 13 of the adhesive tape platform 12 are activated when the adhesive tape platform 12 is cut along the cut line 26. In these examples, the adhesive tape platform 12 includes one or more embedded energy sources (e.g., thin film batteries, which may be printed, or conventional cell batteries, such as conventional watch style batteries, rechargeable batteries, or other energy storage device, such as a super capacitor or charge pump) that supply power to the transducing components 14 in one or more segments of the adhesive tape platform 12 in response to being separated from the adhesive tape platform 12 (e.g., along the cut line 26).

In some examples, each segment 13 of the adhesive tape platform 12 includes its own respective energy source including energy harvesting elements that can harvest energy from the environment. In some of these examples, each energy source is configured to only supply power to the components in its respective adhesive tape platform segment regardless of the number of contiguous segments 13 that are in a given length of the adhesive tape platform 12. In other examples, when a given length of the adhesive tape platform 12 includes multiple segments 13, the energy sources in the respective segments 13 are configured to supply power to the transducing components 14 in all of the segments 13 in the given length of the adhesive tape platform 12. In some of these examples, the energy sources are connected in parallel and concurrently activated to power the transducing components 14 in all of the segments 13 at the same time. In other examples, the energy sources are connected in parallel and alternately activated to power the transducing components 14 in respective ones of the adhesive tape platform segments 13 at different time periods, which may or may not overlap.

Figure 2:
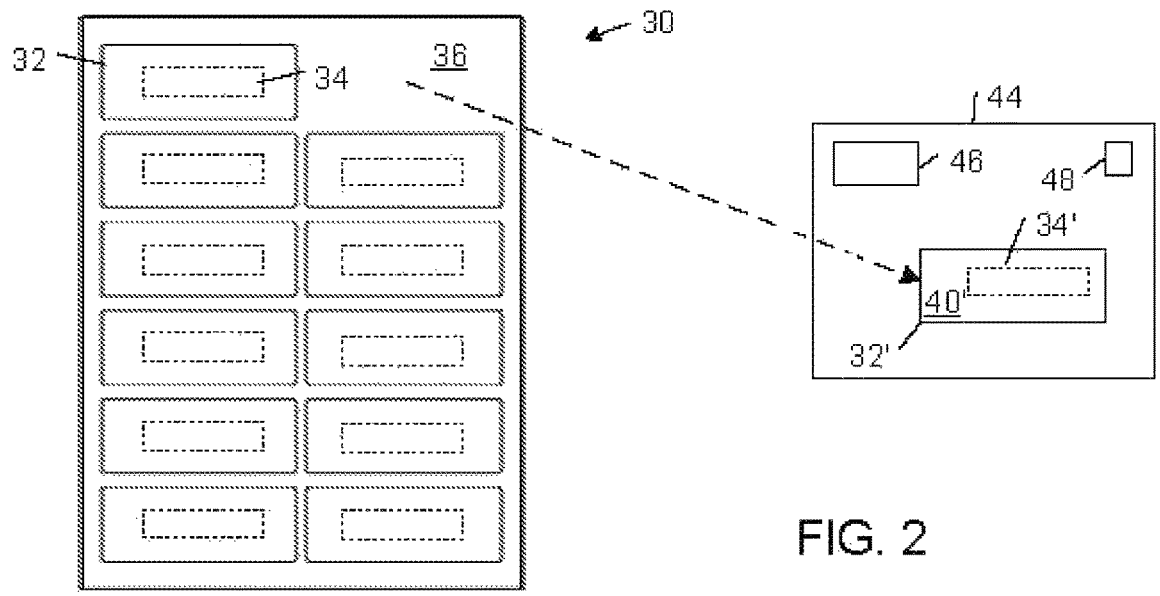
FIG. 2 is a diagrammatic view of an example of an envelope carrying a segment of an example adhesive tape platform dispensed from a backing sheet.

FIG. 2 shows an example adhesive tape platform 30 that includes a set of adhesive tape platform segments 32 each of which includes a respective set of embedded wireless transducing circuit components 34, and a backing sheet 36 with a release coating that prevents the adhesive segments 32 from adhering strongly to the backing sheet 36. Each adhesive tape platform segment 32 includes an adhesive side facing the backing sheet 36, and an opposing non-adhesive side 40. In this example, a particular segment 32' of the adhesive tape platform 30 has been removed from the backing sheet 36 and affixed to an envelope 44. Each segment 32 of the adhesive tape platform 30 can be removed from the backing sheet 36 in the same way that adhesive labels can be removed from a conventional sheet of adhesive labels (e.g., by manually peeling a segment 32 from the backing sheet 36). In general, the non-adhesive side 40' of the segment 32' may include any type of writing, markings, decorative designs, or other ornamentation. In the illustrated example, the non-adhesive side 40' of the segment 32' includes writing or other markings that correspond to a destination address for the envelope 44. The envelope 44 also includes a return address 46 and, optionally, a postage stamp or mark 48.

In some examples, segments of the adhesive tape platform 12 are deployed by a human operator. The human operator may be equipped with a mobile phone or other device that allows the operator to authenticate and initialize the adhesive tape platform 12. In addition, the operator can take a picture of a parcel including the adhesive tape platform and any barcodes associated with the parcel and, thereby, create a persistent record that links the adhesive tape platform 12 to the parcel. In addition, the human operator typically will send the picture to a network service and/or transmit the picture to the adhesive tape platform 12 for storage in a memory component of the adhesive tape platform 12.

In some examples, the wireless transducing circuit components 34 that are embedded in a segment 32 of the adhesive tape platform 12 are activated when the segment 32 is removed from the backing sheet 32. In some of these examples, each segment 32 includes an embedded capacitive sensing system that can sense a change in capacitance when the segment 32 is removed from the backing sheet 36. As explained in detail below, a segment 32 of the adhesive tape platform 30 includes one or more embedded energy sources (e.g., thin film batteries, common disk-shaped cell batteries, or rechargeable batteries or other energy storage devices, such as a super capacitor or charge pump) that can be configured to supply power to the wireless transducing circuit components 34 in the segment 32 in response to the detection of a change in capacitance between the segment 32 and the backing sheet 36 as a result of removing the segment 32 from the backing sheet 36.

Figure 3:
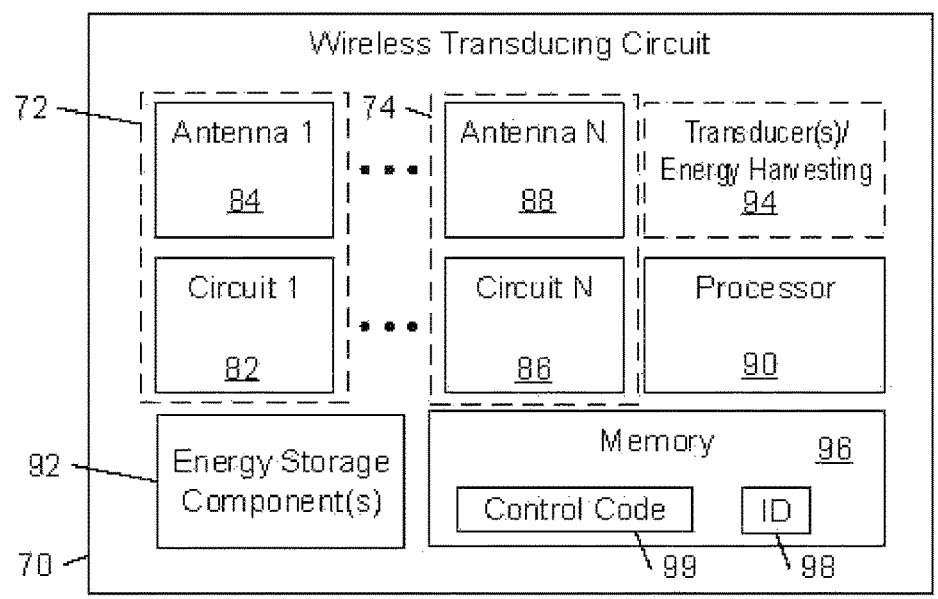
FIG. 3 is a schematic view of an example segment of an adhesive tape platform.

FIG. 3 shows a block diagram of the components of an example wireless transducing circuit 70 that includes a number of communication systems 72, 74. Example communication systems 72, 74 include a GPS system that includes a GPS receiver circuit 82 (e.g., a receiver integrated circuit) and a GPS antenna 84, and one or more wireless communication systems each of which includes a respective transceiver circuit 86 (e.g., a transceiver integrated circuit) and a respective antenna 88. Example wireless communication systems include a cellular communication system (e.g., GSM/GPRS), a Wi-Fi communication system, an RF communication system (e.g., LoRa), a Bluetooth communication system (e.g., a Bluetooth Low Energy system), a Z-wave communication system, and a ZigBee communication system. The wireless transducing circuit 70 also includes a processor 90 (e.g., a microcontroller or microprocessor), one or more energy storage devices 92 (e.g., non-rechargeable or rechargeable printed flexible battery, conventional single or multiple cell battery, and/or a super capacitor or charge pump), one or more transducers 94 (e.g., sensors and/or actuators, and, optionally, one or more energy harvesting transducer components). In some examples, the conventional single or multiple cell battery may be a watch style disk or button cell battery that is associated electrical connection apparatus (e.g., a metal clip) that electrically connects the electrodes of the battery to contact pads on the flexible circuit 116.

Examples of sensing transducers 94 include a capacitive sensor, an altimeter, a gyroscope, an accelerometer, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, an electromagnetic field sensor, and a humidity sensor. Examples of actuating (e.g., energy emitting) transducers 94 include light emitting components (e.g., light emitting diodes and displays), electro-acoustic transducers (e.g., audio speakers), electric motors, and thermal radiators (e.g., an electrical resistor or a thermoelectric cooler).

In some examples, the wireless transducing circuit 70 includes a memory 96 for storing data, including, e.g., profile data, state data, event data, sensor data, localization data, security data, and one or more unique identifiers (ID) 98 associated with the wireless transducing circuit 70, such as a product ID, a type ID, and a media access control (MAC) ID, and control code 99. In some examples, the memory 96 may be incorporated into one or more of the processor 90 or transducers 94, or may be a separate component that is integrated in the wireless transducing circuit 70 as shown in FIG. 3. The control code typically is implemented as programmatic functions or program modules that control the operation of the wireless transducing circuit 70, including a tape node communication manager that manages the manner and timing of tape node communications, a tape node power manager that manages power consumption, and a tape node connection manager that controls whether connections with other tape nodes are secure connections or unsecure connections, and a tape node storage manager that securely manages the local data storage on the node. The tape node connection manager ensures the level of security required by the end application and supports various encryption mechanisms. The tape node power manager and tape communication manager work together to optimize the battery consumption for data communication. In some examples, execution of the control code by the different types of tape nodes described herein may result in the performance of similar or different functions.

Figure 4:
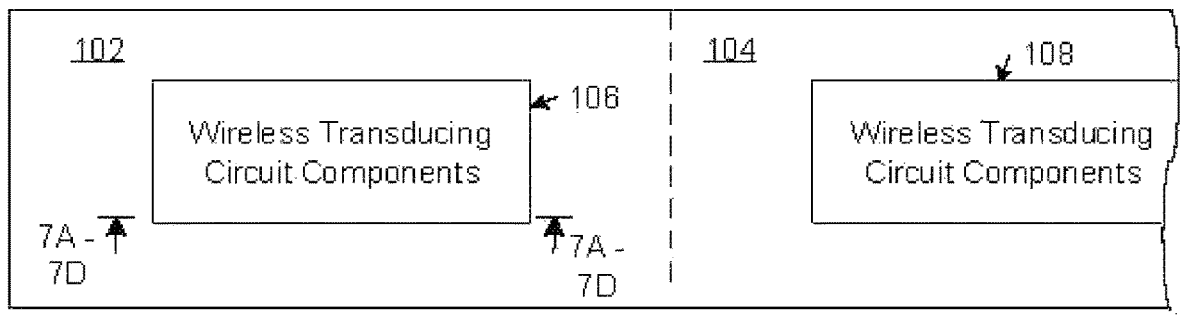
FIG. 4 is a diagrammatic top view of a length of an example adhesive tape platform.

FIG. 4 is a top view of a portion of an example flexible adhesive tape platform 100 that shows a first segment 102 and a portion of a second segment 104. Each segment 102, 104 of the flexible adhesive tape platform 100 includes a respective set 106, 108 of the components of the wireless transducing circuit 70. The segments 102, 104 and their respective sets of components 106, 108 typically are identical and configured in the same way. In some other embodiments, however, the segments 102, 104 and/or their respective sets of components 106, 108 are different and/or configured in different ways. For example, in some examples, different sets of the segments of the flexible adhesive tape platform 100 have different sets or configurations of tracking and/or transducing components that are designed and/or optimized for different applications, or different sets of segments of the flexible adhesive tape platform may have different ornamentations (e.g., markings on the exterior surface of the platform) and/or different (e.g., alternating) lengths.

An example method of fabricating the adhesive tape platform 100 (see FIG. 4) according to a roll-to-roll fabrication process is described in connection with FIGS. 6, 7A, and 7B of U.S. patent application Ser. No. 15/842,861, filed Dec. 14, 2017, the entirety of which is incorporated herein by reference.

The instant specification describes an example system of adhesive tape platforms (also referred to herein as "tape nodes") that can be used to implement a low-cost wireless network infrastructure for performing monitoring, tracking, and other logistic functions relating to, for example, parcels, persons, tools, equipment and other physical assets and objects. The example system includes a set of three different types of tape nodes that have different respective functionalities and different respective cover markings that visually distinguish the different tape node types from one another. In one non-limiting example, the covers of the different tape node types are marked with different colors (e.g., white, green, and black). In the illustrated examples, the different tape node types are distinguishable from one another by their respective wireless communications capabilities and their respective sensing capabilities.

Figure 5A:
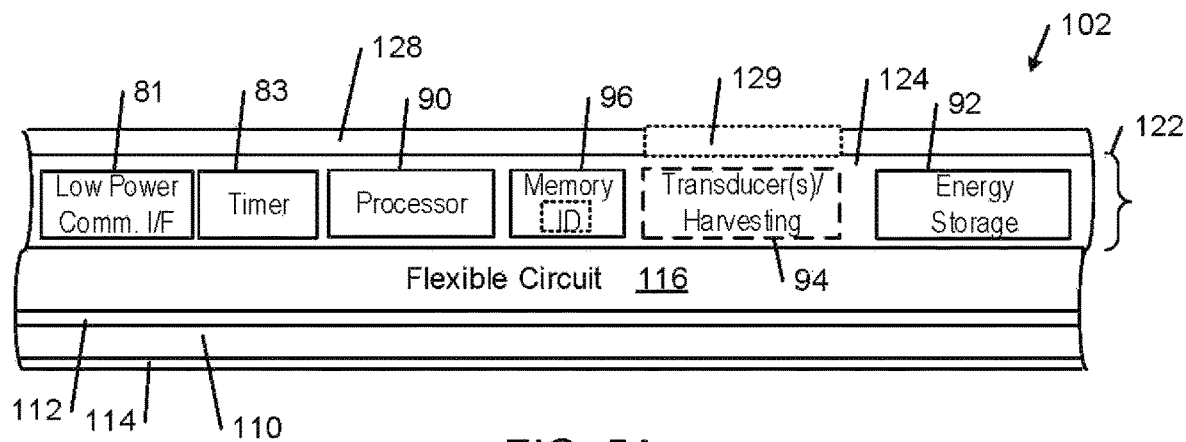
FIGS. 5A-5C show diagrammatic cross-sectional side views of portions of different respective adhesive tape platforms.

FIG. 5A shows a cross-sectional side view of a portion of an example segment 102 of the flexible adhesive tape platform 100 that includes a respective set of the components of the wireless transducing circuit 106 corresponding to the first tape node type (i.e., white). The flexible adhesive tape platform segment 102 includes an adhesive layer 112, an optional flexible substrate 110, and an optional adhesive layer 114 on the bottom surface of the flexible substrate 110. If the bottom adhesive layer 114 is present, a release liner (not shown) may be (weakly) adhered to the bottom surface of the adhesive layer 114. In some examples, the adhesive layer 114 includes an adhesive (e.g., an acrylic foam adhesive) that has a high bond strength that is sufficient to prevent removal of the adhesive segment 102 from a surface on which the adhesive layer 114 is adhered without destroying the physical or mechanical integrity of the adhesive segment 102 and/or one or more of its constituent components. In some examples, the optional flexible substrate 110 is implemented as a prefabricated adhesive tape that includes the adhesive layers 112, 114 and the optional release liner. In other examples, the adhesive layers 112, 114 are applied to the top and bottom surfaces of the flexible substrate 110 during the fabrication of the adhesive tape platform 100. The adhesive layer 112 bonds the flexible substrate 110 to a bottom surface of a flexible circuit 116, that includes one or more wiring layers (not shown) that connect the processor 90, a low power wireless communication interface 81 (e.g., a Zigbee, Bluetooth® Low Energy (BLE) interface, or other low power communication interface), a timer circuit 83, transducing and/or energy harvesting component(s) 94 (if present), the memory 96, and other components in a device layer 122 to each other and to the energy storage component 92 and, thereby, enable the transducing, tracking and other functionalities of the flexible adhesive tape platform segment 102. The low power wireless communication interface 81 typically includes one or more of the antennas 84, 88 and one or more of the wireless circuits 82, 86.

Figure 5B:
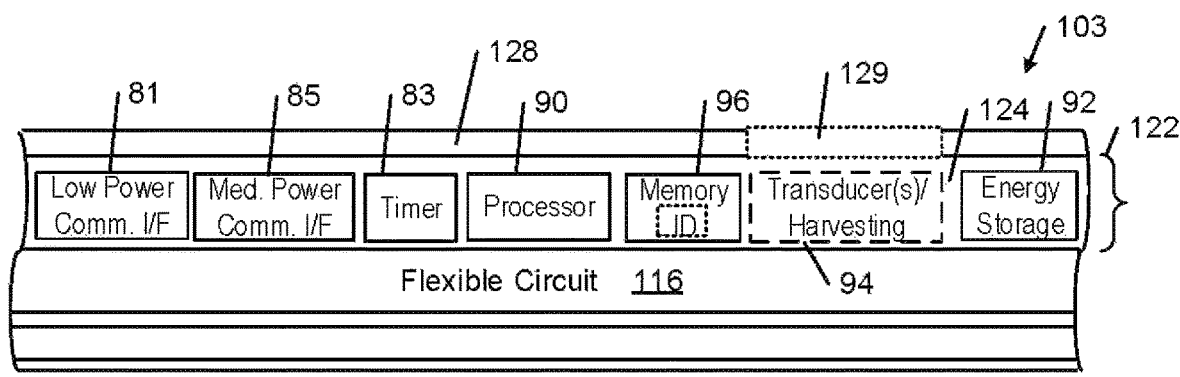

FIG. 5B shows a cross-sectional side view of a portion of an example segment 103 of the flexible adhesive tape platform 100 that includes a respective set of the components of the wireless transducing circuit 106 corresponding to the second tape node type (i.e., green). In this example, the flexible adhesive tape platform segment 103 differs from the segment 102 shown in FIG. 5A by the inclusion of a medium power communication interface 85 (e.g., a LoRa interface) in addition to the low power communications interface that is present in the first tape node type (i.e., white). The medium power communication interface has longer communication range than the low power communication interface. In some examples, one or more other components of the flexible adhesive tape platform segment 103 differ, for example, in functionality or capacity (e.g., larger energy source).

Figure 5C:
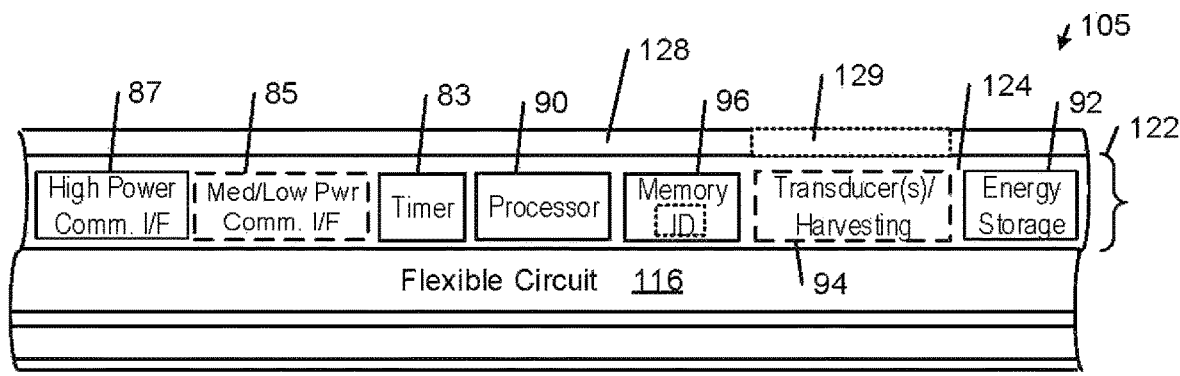

FIG. 5C shows a cross-sectional side view of a portion of an example segment 105 of the flexible adhesive tape platform 100 that includes a respective set of the components of the wireless transducing circuit 106 corresponding to the third tape node type (i.e., black). In this example, the flexible adhesive tape platform segment 105 includes a high power communications interface 87 (e.g., a cellular interface; e.g., GSM/GPRS) and an optional medium and/or low power communications interface 85. The high power communication range provides global coverage to available infrastructure (e.g. the cellular network). In some examples, one or more other components of the flexible adhesive tape platform segment 105 differ, for example, in functionality or capacity (e.g., larger energy source).

FIGS. 5A-5C show examples in which the cover layer 128 of the flexible adhesive tape platform 100 includes one or more interfacial regions 129 positioned over one or more of the transducers 94. In examples, one or more of the interfacial regions 129 have features, properties, compositions, dimensions, and/or characteristics that are designed to improve the operating performance of the platform 100 for specific applications. In some examples, the flexible adhesive tape platform 100 includes multiple interfacial regions 129 over respective transducers 94, which may be the same or different depending on the target applications. Example interfacial regions include an opening, an optically transparent window, and/or a membrane located in the interfacial region 129 of the cover 128 that is positioned over the one or more transducers and/or energy harvesting components 94. Additional details regarding the structure and operation of example interfacial regions 129 are described in U.S. Provisional Patent Application No. 62/680,716, filed Jun. 5, 2018, and U.S. Provisional Patent Application No. 62/670,712, filed May 11, 2018.

In some examples, a flexible polymer layer 124 encapsulates the device layer 122 and thereby reduces the risk of damage that may result from the intrusion of contaminants and/or liquids (e.g., water) into the device layer 122. The flexible polymer layer 124 also planarizes the device layer 122. This facilitates optional stacking of additional layers on the device layer 122 and also distributes forces generated in, on, or across the adhesive tape platform segment 102 so as to reduce potentially damaging asymmetric stresses that might be caused by the application of bending, torqueing, pressing, or other forces that may be applied to the flexible adhesive tape platform segment 102 during use. In the illustrated example, a flexible cover 128 is bonded to the planarizing polymer 124 by an adhesive layer (not shown).

The flexible cover 128 and the flexible substrate 110 may have the same or different compositions depending on the intended application. In some examples, one or both of the flexible cover 128 and the flexible substrate 110 include flexible film layers and/or paper substrates, where the film layers may have reflective surfaces or reflective surface coatings. Example compositions for the flexible film layers include polymer films, such as polyester, polyimide, polyethylene terephthalate (PET), and other plastics. The optional adhesive layer on the bottom surface of the flexible cover 128 and the adhesive layers 112, 114 on the top and bottom surfaces of the flexible substrate 110 typically include a pressure-sensitive adhesive (e.g., a silicon-based adhesive). In some examples, the adhesive layers are applied to the flexible cover 128 and the flexible substrate 110 during manufacture of the adhesive tape platform 100 (e.g., during a roll-to-roll or sheet-to-sheet fabrication process). In other examples, the flexible cover 128 may be implemented by a prefabricated single-sided pressure-sensitive adhesive tape and the flexible substrate 110 may be implemented by a prefabricated double-sided pressure-sensitive adhesive tape; both kinds of tape may be readily incorporated into a roll-to-roll or sheet-to-sheet fabrication process. In some examples, the flexible polymer layer 124 is composed of a flexible epoxy (e.g., silicone).

In some examples, the energy storage device 92 is a flexible battery that includes a printed electrochemical cell, which includes a planar arrangement of an anode and a cathode and battery contact pads. In some examples, the flexible battery may include lithium-ion cells or nickel-cadmium electro-chemical cells. The flexible battery typically is formed by a process that includes printing or laminating the electro-chemical cells on a flexible substrate (e.g., a polymer film layer). In some examples, other components may be integrated on the same substrate as the flexible battery. For example, the low power wireless communication interface 81 and/or the processor(s) 90 may be integrated on the flexible battery substrate. In some examples, one or more of such components also (e.g., the flexible antennas and the flexible interconnect circuits) may be printed on the flexible battery substrate.

In some examples, the flexible circuit 116 is formed on a flexible substrate by printing, etching, or laminating circuit patterns on the flexible substrate. In some examples, the flexible circuit 116 is implemented by one or more of a single-sided flex circuit, a double access or back bared flex circuit, a sculpted flex circuit, a double-sided flex circuit, a multi-layer flex circuit, a rigid flex circuit, and a polymer thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multi-step etching process that produces a flex circuit that has finished copper conductors that vary in thickness along their respective lengths. A multilayer flex circuit has three or more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the example flexible adhesive tape platform segments 102 shown in FIGS. 5A-5C, the flexible circuit 116 is a single access flex circuit that interconnects the components of the adhesive tape platform on a single side of the flexible circuit 116. In other examples, the flexible circuit 116 is a double access flex circuit that includes a front-side conductive pattern that interconnects the low power communications interface 81, the timer circuit 83, the processor 90, the one or more transducers 94 (if present), and the memory 96, and allows through-hole access (not shown) to a back-side conductive pattern that is connected to the flexible battery (not shown). In these examples, the front-side conductive pattern of the flexible circuit 116 connects the communications circuits 82, 86 (e.g., receivers, transmitters, and transceivers) to their respective antennas 84, 88 and to the processor 90, and also connects the processor 90 to the one or more sensors 94 and the memory 96. The backside conductive pattern connects the active electronics (e.g., the processor 90, the communications circuits 82, 86, and the transducers) on the front-side of the flexible circuit 116 to the electrodes of the flexible battery 116 via one or more through holes in the substrate of the flexible circuit 116.

Depending on the target application, the wireless transducing circuits 70 are distributed across the flexible adhesive tape platform 100 according to a specified sampling density, which is the number of wireless transducing circuits 70 for a given unit size (e.g., length or area) of the flexible adhesive tape platform 100. In some examples, a set of multiple flexible adhesive tape platforms 100 are provided that include different respective sampling densities in order to seal different package sizes with a desired number of wireless transducing circuits 70. In particular, the number of wireless transducing circuits per package size is given by the product of the sampling density specified for the adhesive tape platform and the respective size of the adhesive tape platform 100 needed to seal the package. This allows an automated packaging system to select the appropriate type of flexible adhesive tape platform 100 to use for sealing a given package with the desired redundancy (if any) in the number of wireless transducer circuits 70. In some example applications (e.g., shipping low value goods), only one wireless transducing circuit 70 is used per package, whereas in other applications (e.g., shipping high value goods) multiple wireless transducing circuits 70 are used per package. Thus, a flexible adhesive tape platform 100 with a lower sampling density of wireless transducing circuits 70 can be used for the former application, and a flexible adhesive tape platform 100 with a higher sampling density of wireless transducing circuits 70 can be used for the latter application. In some examples, the flexible adhesive tape platforms 100 are color-coded or otherwise marked to indicate the respective sampling densities with which the wireless transducing circuits 70 are distributed across the different types of adhesive tape platforms 100.

Some logistics applications do not require tracking and/or sensor data for every parcel shipped. Instead, sufficient information for decision-making can be obtained by collecting data from a sample of the packages shipped. In these examples, a substantial reduction in shipment tracking costs can be realized by selecting a sampling density of the deployed wireless transducing circuits 70 that achieves a target tracked package sampling rate that is less than unity. In these embodiments, some packages would not be tracked or monitored. However, the sample size can be selected to be sufficient to make inferences about a population of packages shipped with a desired level of accuracy.

Figure 6A:
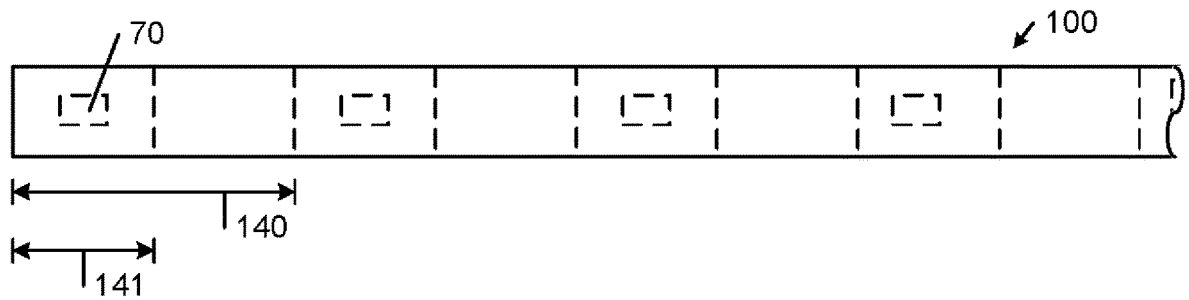
FIGS. 6A-6D show diagrammatic top views of lengths of example flexible adhesive tape platforms that have different respective sampling densities of wireless transducing circuits.

For example, FIG. 6A shows an example length of the flexible adhesive tape platform 100 in which the sampling density is 0.5 (i.e., one wireless transducing circuit per two unit lengths 141 of the flexible adhesive tape platform 100). In this example, assuming the unit length corresponds to the length of the flexible adhesive tape platform 100 needed to seal a package and the flexible adhesive tape platform 100 is cut along the dashed lines, half of the packages would be sealed with a length of the flexible adhesive platform 100 that includes wireless transducing circuits 70.

Figure 6B:
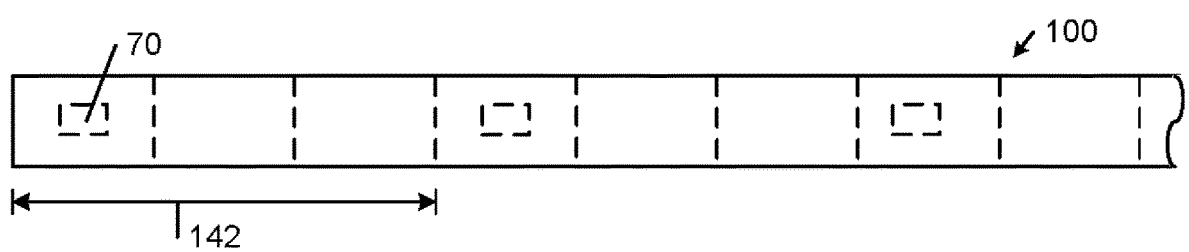

FIG. 6B shows an example length of the flexible adhesive tape platform 100 in which the sampling density is one-third (i.e., one wireless transducing circuit per three unit lengths 141 of the flexible adhesive tape platform 100). In this example, assuming the unit length corresponds to the length of the flexible adhesive tape platform 100 needed to seal a package and the flexible adhesive tape platform 100 is cut along the dashed lines, one third of the packages would be sealed with a length of the flexible adhesive platform 100 that includes wireless transducing circuits 70.

Figure 6C:
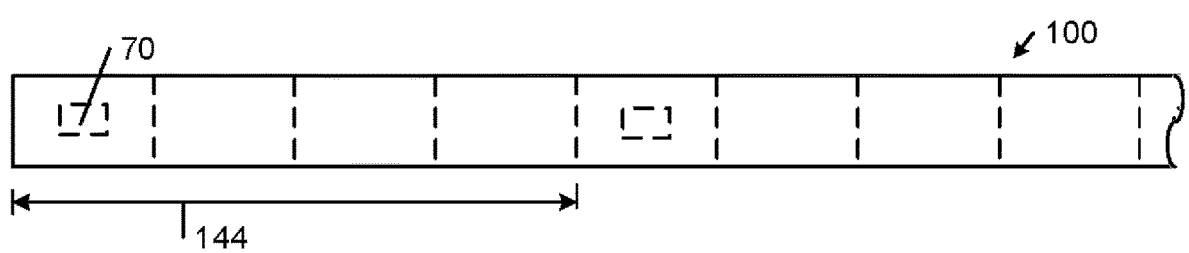

FIG. 6C shows an example length of the flexible adhesive tape platform 100 in which the sampling density is 0.25 (i.e., one wireless transducing circuit per four unit lengths 141 of the flexible adhesive tape platform 100). In this example, assuming the unit length corresponds to the length of the flexible adhesive tape platform 100 needed to seal a package and the flexible adhesive tape platform 100 is cut along the dashed lines, one fourth of the packages be sealed with a length of the flexible adhesive platform 100 that includes wireless transducing circuits 70.

Figure 6D:
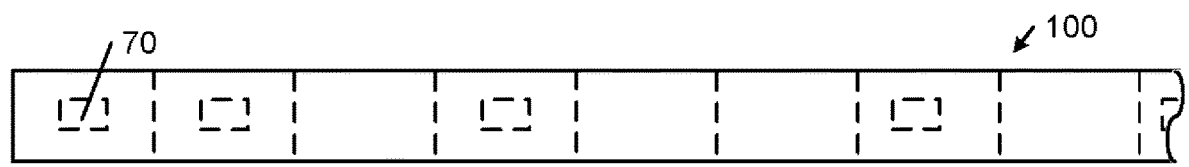

FIG. 6D shows an example length of the flexible adhesive tape platform 100 in which the sampling density is 0.25 (i.e., one wireless transducing circuit per two unit lengths 141 of the flexible adhesive tape platform 100). In this example, the wireless transducing circuits 70 are pseudo-randomly distributed along the length of the flexible adhesive tape platform 100 according to a probability distribution. Assuming the unit length corresponds to the length of the flexible adhesive tape platform 100 needed to seal a package and the flexible adhesive tape platform 100 is cut along the dashed lines, one half of the packages would be sealed with a length of the flexible adhesive platform 100 that includes wireless transducing circuits 70.

In the examples shown in FIGS. 6A-6D, a plurality of wireless transducing circuits 70 is distributed across the continuous flexible adhesive tape platforms 100 according to a respective sampling density. Each wireless transducing circuit 70 includes an antenna, a wireless communications circuit coupled to the antenna, a transducer, a controller electrically connected to the wireless communications circuit and the transducer, and an energy source connected to the controller, the transducer, and the wireless communications circuit. In some examples, the wireless transducing circuits are uniform in function and composition. In some examples, the sampling density is the density of wireless transducing circuits 70 as a function of a unit size of the continuous flexible adhesive tape platform. In some examples, the wireless transducing circuits are interspersed among regions of the continuous flexible adhesive tape platform 100 that are free of any wireless transducing circuits. In some applications, the wireless transducing circuits 70 are interspersed among the regions of the continuous flexible adhesive tape platform 100 that are free of any wireless transducing circuits according to a linear sampling density. In some examples, each of the regions of the continuous flexible adhesive tape platform 100 that are free of any wireless transducing circuits 70 is free of active electrical components. In other applications, the wireless transducing circuits 70 are interspersed among regions of the continuous flexible adhesive tape platform 100 that are free of any wireless transducing circuits 70 according to an areal sampling density. In some examples, the wireless transducing circuits 70 are distributed at regular intervals along the continuous flexible adhesive tape platform 100. In some examples, the wireless transducing circuits 70 are distributed across the continuous flexible adhesive tape platform 100 according to a probability distribution. In some examples, the continuous flexible adhesive tape platform 100 is carried on a cylindrical tape core. In some examples, the regions of the continuous flexible adhesive tape platform 100 that include wireless transducing circuits 70 are visually indistinguishable from other regions of the continuous flexible adhesive tape platform 100.

In some examples, multiple different types continuous flexible adhesive tape platforms 100 are bundled together and packaged as a set. In these examples, the continuous flexible adhesive tape platforms 100 typically are carried on respective cylindrical tape cores and include respective pluralities of wireless transducing circuits 70 distributed across the respective platforms 100 according to respective sampling densities at least two of which are different. In some examples, a first continuous flexible adhesive tape platform 100 in the set includes a backing that includes a first visible marking and a second continuous flexible adhesive tape platform includes a backing that includes a second visible marking that is different from the first visible marking. In some examples, the first and second continuous flexible adhesive tape platforms are color-coded differently (e.g., the backing of different tape platforms are different respective colors).

In some examples, segments of the continuous flexible adhesive tape platforms 100 are used to monitor or detect the states or conditions of, surrounding, or affecting parcels and their respective assets. In accordance with one example, unit size portions of a continuous flexible adhesive tape platform 100 are dispensed, where the continuous flexible adhesive tape platform 100 includes a plurality of wireless transducing circuits 70 distributed across the platform according to a sampling density of wireless transducing circuits 70 as a function of the unit size portions of the continuous flexible adhesive tape platform and the sampling density is less than 1. The dispensed portion of the continuous flexible adhesive tape platform is affixed to seal a package. A network node of a network service (e.g., the network service 54 of an inventory management system) establishes a wireless connection with the wireless transducing circuit 70 in the affixed dispensed portion of continuous flexible adhesive tape platform. Based on a successful establishment of the wireless connection with the wireless transducing circuit 70, a unique identifier of the wireless transducing circuit 70 and transducer data from the wireless transducing circuit 70 are obtained. The obtained transducer data is reported in association with the unique identifier to a network node of the network 54. In some examples, the obtained transducer data includes geographic location data. In some examples, the obtained transducer data includes sensor data characterizing ambient conditions in the vicinity of the dispensed portion of the continuous flexible adhesive tape platform 100.

Because battery power is finite and the power needs of the adhesive tape platform segment for any particular application generally is unknown, some examples of the adhesive tape platform segments are preconfigured in a low power or a powered-off state, and remain in the low power or powered-off state until a predetermined event occurs. In some cases, the predetermined event indicates that the adhesive tape platform segment has been deployed for use in the field. Example events include cutting a segment of an adhesive tape platform from a roll, bending a segment of an adhesive tape platform as it is being peeled off of a roll, separating a segment of an adhesive tape platform from a backing sheet, and detecting a change in state of the adhesive tape platform or its environment. In some examples, a label is affixed to packaging containing the continuous flexible adhesive tape platform 100, where the label carries, e.g., text, barcode, and/or wireless identifier, such as an RFID circuit, that includes an indication of the sampling density of wireless transducing circuits 70 as a function of a unit size of the continuous flexible adhesive tape platform. In some examples, the unit size corresponds to a length dimension; in other examples the unit size corresponds to an areal dimension.

In some examples, an adhesive tape platform includes a one-time wake circuit that delivers power from a respective energy source to a respective wireless circuit (e.g., a circuit comprising a processor, one or more transducers, and one or more wireless communications circuits) in response to an event that wakes the one-time wake circuit.

Figure 7:
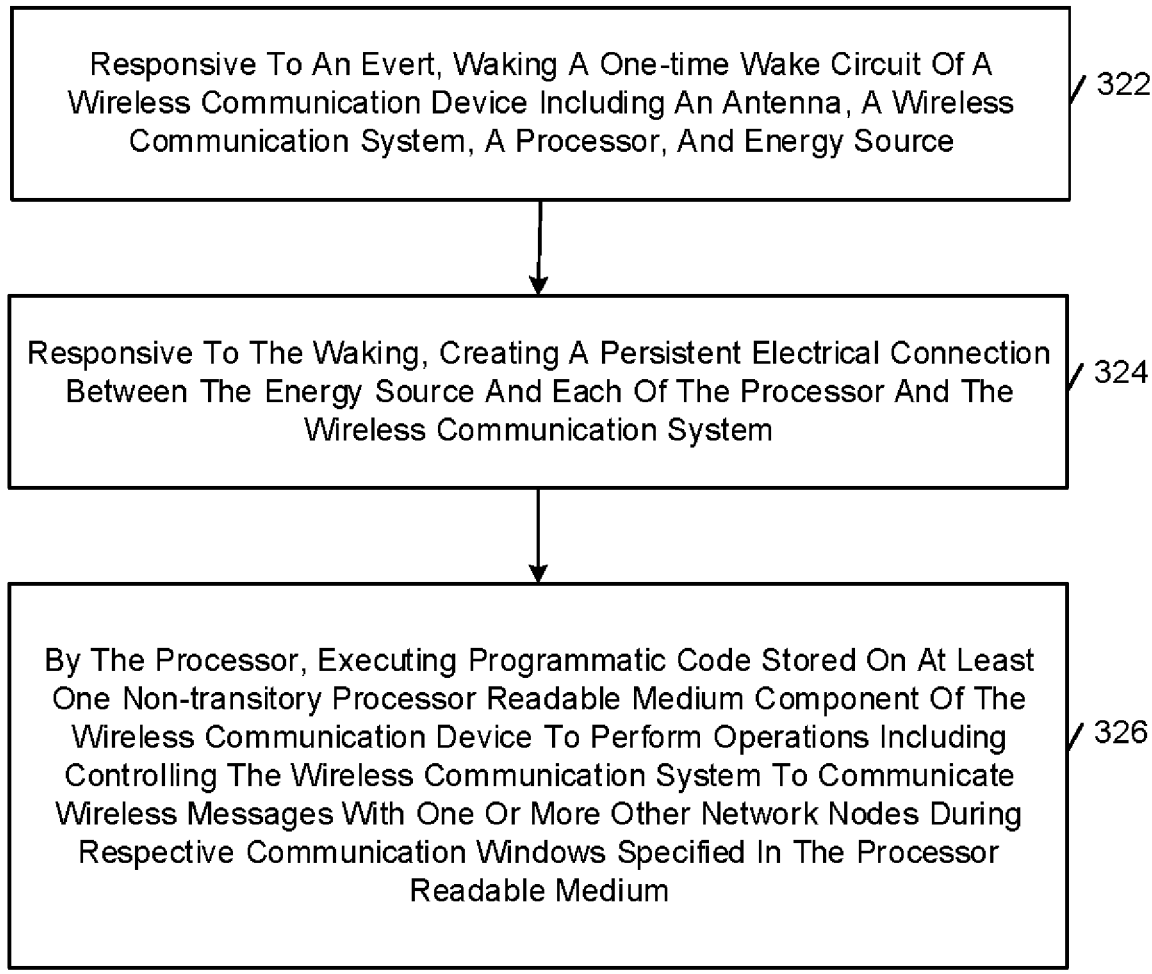
FIG. 7 is a flow diagram of a method of activating a wireless communication device by waking a one-time wake circuit.

FIG. 7 shows a series of operations performed by an example wireless communication device (e.g., an adhesive tape platform) that includes a one-time wake circuit between an energy source and each of the processor and the wireless communication system. Responsive to an event, the one-time wake circuit of the wireless communication device is woken (FIG. 7, block 322). Responsive to the waking of the one-time wake circuit, a persistent electrical connection between the energy source and each of the processor and the wireless communication system is created (FIG. 7, block 324). By the processor, executing programmatic code stored on at least one non-transitory processor readable medium component of the wireless communication device to perform operations including controlling the wireless communication system to communicate wireless messages with one or more other network nodes during respective communication windows specified in the processor readable medium (FIG. 7, block 326). In some examples, the communication windows referenced in block 326 are pre-determined and can be adaptively modified by the processor in an environment. In some examples, the predetermined schedule is obtained by analyzing the battery size, the tape node power consumption, and the tolerable latency in communication. A mathematical model is created that can be solved by the modern optimization algorithms (e.g., artificial intelligence, neural nets, and other machine learning computing systems). A scheduling language is used to specify the schedule for a set of nodes. The processor can adapt the environment using machine learning algorithms to optimize the performance in a given environment.

Figure 8A:
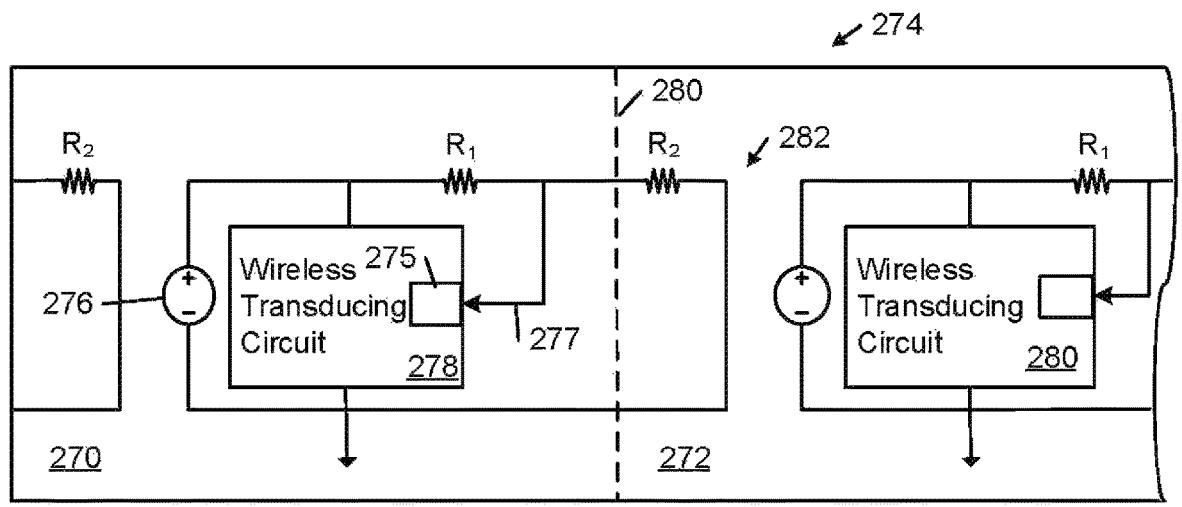
FIGS. 8A-8B show diagrammatic top views of respective lengths of example adhesive tape platforms.

Referring to FIG. 8A, in some examples, each of one or more of the segments 270, 272 of a flexible adhesive tape platform 274 includes a respective one-time wake circuit 275 that delivers power from the respective energy source 276 to the respective wireless circuit 278 (e.g., a processor, one or more transducers, and one or more wireless communications circuits) in response to an event. In some of these examples, the wake circuit 275 is configured to transition from an off state to an on state when the voltage on the wake node 277 exceeds a threshold level, at which point the wake circuit transitions to an on state to power-on the segment 270. In the illustrated example, this occurs when the user separates the segment from the adhesive tape platform 274, for example, by cutting across the adhesive tape platform 274 at a designated location (e.g., along a designated cut-line 280). In particular, in its initial, un-cut state, a minimal amount of current flows through the resistors $R_1$ and $R_2$. As a result, the voltage on the wake node 277 remains below the threshold turn-on level. After the user cuts across the adhesive tape platform 274 along the designated cut-line 280, the user creates an open circuit in the loop 282, which pulls the voltage of the wake node above the threshold level and turns on the wake circuit 275. As a result, the voltage across the energy source 276 will appear across the wireless circuit 278 and, thereby, turn on the segment 270. In particular embodiments, the resistance value of resistor $R_1$ is greater than the resistance value of $R_2$. In some examples, the resistance values of resistors $R_1$ and $R_2$ are selected based on the overall design of the adhesive product system (e.g., the target wake voltage level and a target leakage current).

In some examples, each of one or more of the segments of an adhesive tape platform includes a respective sensor and a respective wake circuit that delivers power from the respective energy source to the respective one or more of the respective wireless circuit components 278 in response to an output of the sensor. In some examples, the respective sensor is a strain sensor that produces a wake signal based on a change in strain in the respective segment. In some of these examples, the strain sensor is affixed to a adhesive tape platform and configured to detect the stretching of the tracking adhesive tape platform segment as the segment is being peeled off a roll or a sheet of the adhesive tape platform. In some examples, the respective sensor is a capacitive sensor that produces a wake signal based on a change in capacitance in the respective segment. In some of these examples, the capacitive sensor is affixed to an adhesive tape platform and configured to detect the separation of the tracking adhesive tape platform segment from a roll or a sheet of the adhesive tape platform. In some examples, the respective sensor is a flex sensor that produces a wake signal based on a change in curvature in the respective segment. In some of these examples, the flex sensor is affixed to a adhesive tape platform and configured to detect bending of the tracking adhesive tape platform segment as the segment is being peeled off a roll or a sheet of the adhesive tape platform. In some examples, the respective sensor is a near field communications sensor that produces a wake signal based on a change in inductance in the respective segment.

Figure 8B:
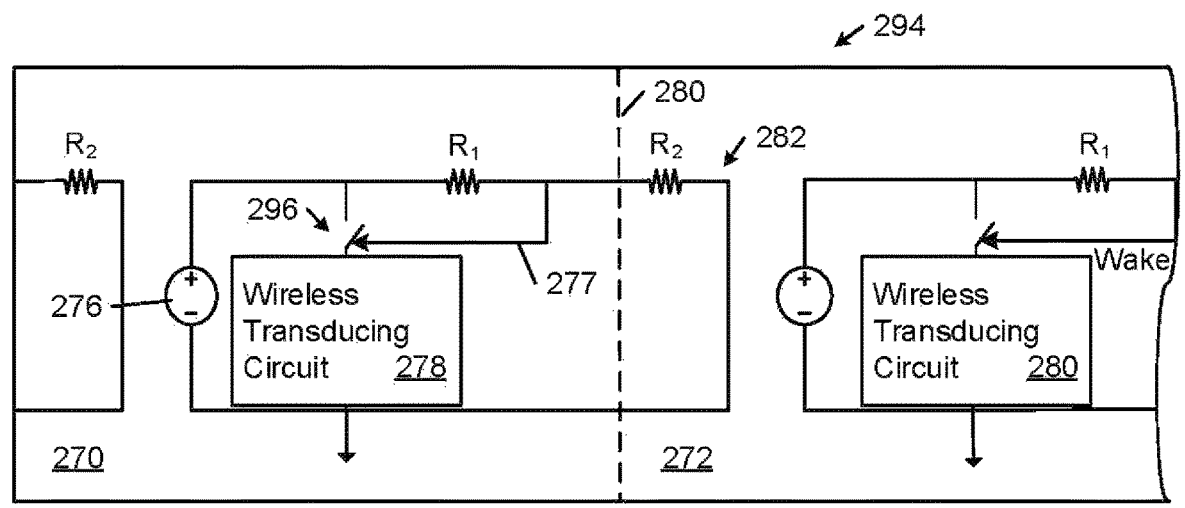

FIG. 8B shows another example of an adhesive tape platform 294 that delivers power from the respective energy source 276 to the respective tracking circuit 278 (e.g., a processor, one or more transducers, and one or more wireless communications circuits) in response to an event. This example is similar in structure and operation as the adhesive tape platform 294 shown in FIG. 8A, except that the wake circuit 275 is implemented by a switch 296 that is configured to transition from an open state to a closed state when the voltage on the switch node 277 exceeds a threshold level. In the initial state of the adhesive tape platform 294, the voltage on the switch node is below the threshold level as a result of the low current level flowing through the resistors $R_1$ and $R_2$. After the user cuts across the adhesive tape platform 294 along the designated cut-line 280, the user creates an open circuit in the loop 282, which pulls up the voltage on the switch node above the threshold level to close the switch 296 and turn on the wireless circuit 278.

Figure 8C:
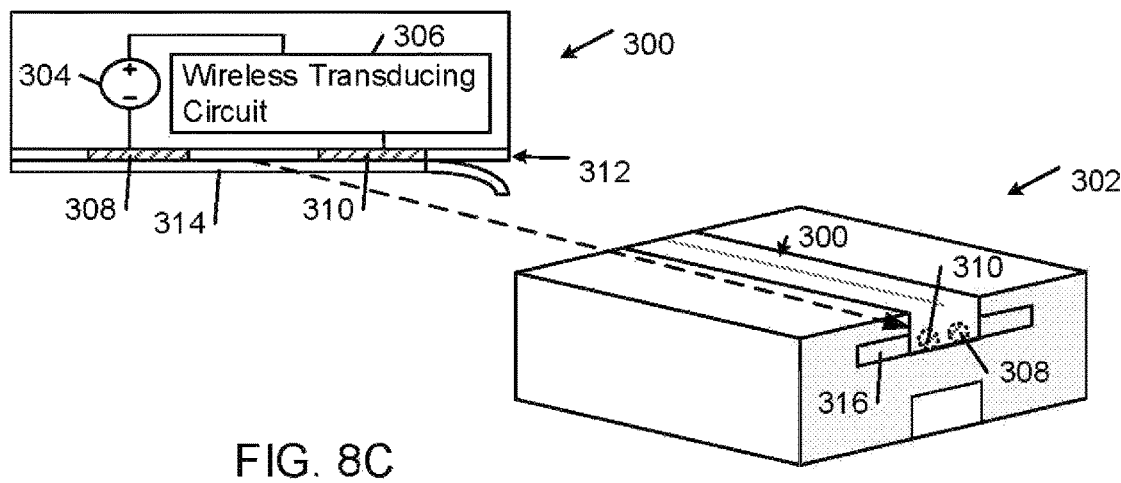
FIG. 8C is diagrammatic cross-sectional side view of an example adhesive tape platform and an example package.

FIG. 8C shows a diagrammatic cross-sectional front view of an example adhesive tape platform 300 and a perspective view of an example package 302. Instead of activating the adhesive tape platform in response to separating a segment of the adhesive tape platform from a roll or a sheet of the adhesive tape platform, this example is configured to supply power from the energy source 302 to turn on the wireless transducing circuit 306 in response to establishing an electrical connection between two power terminals 308, 310 that are integrated into the adhesive tape platform. In particular, each segment of the adhesive tape platform 300 includes a respective set of embedded tracking components, an adhesive layer 312, and an optional backing sheet 314 with a release coating that prevents the segments from adhering strongly to the backing sheet 314. In some examples, the power terminals 308, 310 are composed of an electrically conductive material (e.g., a metal, such as copper) that may be printed or otherwise patterned and/or deposited on the backside of the adhesive tape platform 300. In operation, the adhesive tape platform can be activated by removing the backing sheet 314 and applying the exposed adhesive layer 312 to a surface that includes an electrically conductive region 316. In the illustrated embodiment, the electrically conductive region 316 is disposed on a portion of the package 302. When the adhesive backside of the adhesive tape platform 300 is adhered to the package with the exposed terminals 308, 310 aligned and in contact with the electrically conductive region 316 on the package 302, an electrical connection is created through the electrically conductive region 316 between the exposed terminals 308, 310 that completes the circuit and turns on the wireless transducing circuit 306. In particular embodiments, the power terminals 308, 310 are electrically connected to any respective nodes of the wireless transducing circuit 306 that would result in the activation of the tracking circuit 306 in response to the creation of an electrical connection between the power terminals 308, 310.

In some examples, after a tape node is turned on, it will communicate with the network service to confirm that the user/operator who is associated with the tape node is an authorized user who has authenticated himself or herself to the network service 54. In these examples, if the tape node cannot confirm that the user/operator is an authorized user, the tape node will turn itself off.

III. Deployment of Tape Nodes

Figure 9:
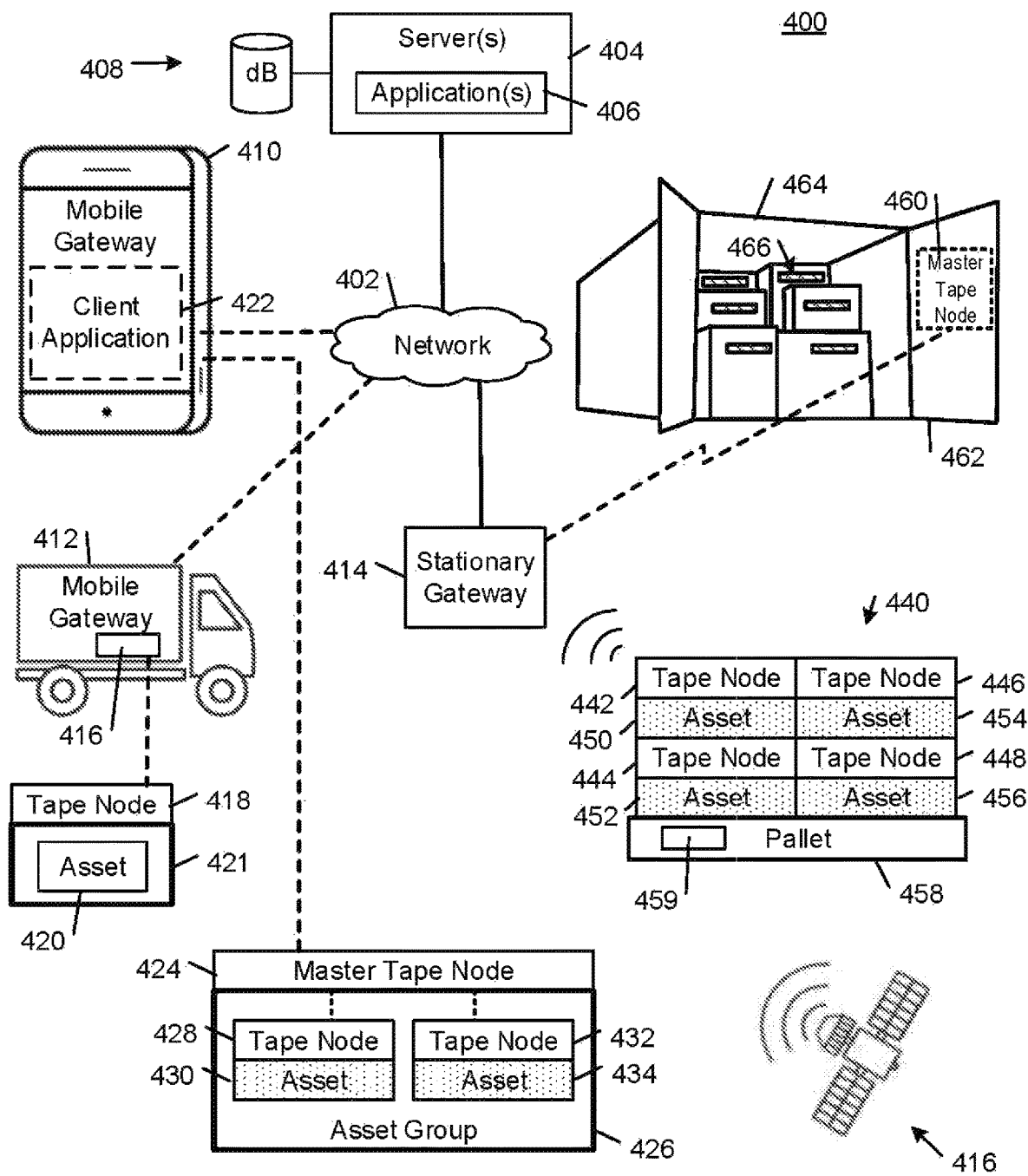
FIG. 9 is a diagrammatic view of an example of a network environment supporting communications with segments of an adhesive tape platform.

FIG. 9 shows an example network communications environment 400 that includes a network 402 that supports communications between one or more servers 404 executing one or more applications of a network service 408, mobile gateways 410, 412, a stationary gateway 414, and various types of tape nodes that are associated with various assets (e.g., parcels, equipment, tools, persons, and other things). In some examples, the network 402 includes one or more network communication systems and technologies, including any one or more of wide area networks, local area networks, public networks (e.g., the internet), private networks (e.g., intranets and extranets), wired networks, and wireless networks. For example, the network 402 includes communications infrastructure equipment, such as a geolocation satellite system 416 (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, and ZigBee communication systems.

In some examples, the one or more network service applications 406 leverage the above-mentioned communications technologies to create a hierarchical wireless network of tape nodes that improves asset management operations by reducing costs and improving efficiency in a wide range of processes, from asset packaging, asset transporting, asset tracking, asset condition monitoring, asset inventorying, and asset security verification. Communication across the network is secured by a variety of different security mechanisms. In the case of existing infrastructure, a communication link the communication uses the infrastructure security mechanisms. In case of communications among tapes nodes, the communication is secured through a custom security mechanism. In certain cases, tape nodes can also be configured to support block chain to protect the transmitted and stored data.

A set of tape nodes can be configured by the network service 408 to create hierarchical communications network. The hierarchy can be defined in terms of one or more factors, including functionality (e.g., wireless transmission range or power), role (e.g., master tape node vs. peripheral tape node), or cost (e.g., a tape node equipped with a cellular transceiver vs. a peripheral tape node equipped with a Bluetooth LE transceiver). Tape nodes can be assigned to different levels of a hierarchical network according to one or more of the above-mentioned factors. For example, the hierarchy can be defined in terms of communication range or power, where tape nodes with higher power or longer communication range transceivers are arranged at a higher level of the hierarchy than tape nodes with lower power or lower range transceivers. In another example, the hierarchy is defined in terms of role, where, e.g., a master tape node is programmed to bridge communications between a designated group of peripheral tape nodes and a gateway node or server node. The problem of finding an optimal hierarchical structure can be formulated as an optimization problem with battery capacity of nodes, power consumption in various modes of operation, desired latency, external environment, etc. and can be solved using modern optimization methods e.g. neural networks, artificial intelligence, and other machine learning computing systems that take expected and historical data to create an optimal solution and can create algorithms for modifying the system's behavior adaptively in the field.

The tape nodes may be deployed by automated equipment or manually. In this process, a tape node typically is separated from a roll or sheet and adhered to a parcel, or other stationary or mobile object (e.g., a structural element of a warehouse, or a vehicle, such as a delivery truck) or stationary object (e.g., a structural element of a building). This process activates the tape node and causes the tape node to communicate with a server 404 of the network service 408. In this process, the tape node may communicate through one or more other tape nodes in the communication hierarchy. In this process, the network server 404 executes the network service application 406 to programmatically configure tape nodes that are deployed in the environment 400. In some examples, there are multiple classes or types of tape nodes, where each tape node class has a different respective set of functionalities and/or capacities.

In some examples, the one or more network service servers 404 communicate over the network 402 with one or more gateways that are configured to send, transmit, forward, or relay messages to the network 402 and activated tape nodes that are associated with respective assets and within communication range. Example gateways include mobile gateways 410, 412 and a stationary gateway 414. In some examples, the mobile gateways 410, 412, and the stationary gateway 414 are able to communicate with the network 402 and with designated sets or groups of tape nodes.

In some examples, the mobile gateway 412 is a vehicle (e.g., a delivery truck or other mobile hub) that includes a wireless communications unit 416 that is configured by the network service 408 to communicate with a designated set of tape nodes, including a peripheral tape node 418 in the form of a label that is adhered to an asset 420 contained within a parcel 421 (e.g., an envelope), and is further configured to communicate with the network service 408 over the network 402. In some examples, the peripheral tape node 418 includes a lower power wireless communications interface of the type used in, e.g., tape node 102 (shown in FIG. 5A), and the wireless communications unit 416 is implemented by a tape node (e.g., one of tape node 103 or tape node 105, respectively shown in FIGS. 5B and 5C) that includes a lower power communications interface for communicating with tape nodes within range of the mobile gateway 412 and a higher power communications interface for communicating with the network 402. In this way, the tape nodes 418 and 416 create a hierarchical wireless network of nodes for transmitting, forwarding, bridging, relaying, or otherwise communicating wireless messages to, between, or on behalf of the peripheral tape node 418 and the network service 408 in a power-efficient and cost-effective way.

In some examples, the mobile gateway 410 is a mobile phone that is operated by a human operator and executes a client application 422 that is configured by the network service 408 to communicate with a designated set of tape nodes, including a master tape node 424 that is adhered to a parcel 426 (e.g., a box), and is further configured to communicate with the network service 408 over the network 402. In the illustrated example, the parcel 426 contains a first parcel labeled or sealed by a tape node 428 and containing a first asset 430, and a second parcel labeled or sealed by a tape node 432 and containing a second asset 434. As explained in detail below, the master tape node 424 communicates with each of the peripheral tape nodes 428, 432 and communicates with the mobile gateway 408 in accordance with a hierarchical wireless network of tape nodes. In some examples, each of the peripheral tape nodes 428, 432 includes a lower power wireless communications interface of the type used in, e.g., tape node 102 (shown in FIG. 5A), and the master tape node 424 is implemented by a tape node (e.g., tape node 103, shown in FIG. 5B) that includes a lower power communications interface for communicating with the peripheral tape nodes 428, 432 contained within the parcel 426, and a higher power communications interface for communicating with the mobile gateway 410. The master tape node 424 is operable to relay wireless communications between the tape nodes 428, 432 contained within the parcel 426 and the mobile gateway 410, and the mobile gateway 410 is operable to relay wireless communications between the master tape node 424 and the network service 408 over the wireless network 402. In this way, the master tape node 424 and the peripheral tape nodes 428 and 432 create a hierarchical wireless network of nodes for transmitting, forwarding, relaying, or otherwise communicating wireless messages to, between, or on behalf of the peripheral tape nodes 428, 432 and the network service 408 in a power-efficient and cost-effective way.

In some examples, the stationary gateway 414 is implemented by a server executing a server application that is configured by the network service 408 to communicate with a designated set 440 of tape nodes 442, 444, 446, 448 that are adhered to respective parcels containing respective assets 450, 452, 454, 456 on a pallet 458. In other examples, the stationary gateway 414 is implemented by a tape node (e.g., one of tape node 103 or tape node 105, respectively shown in FIGS. 5B and 5C) that is adhered to, for example, a wall, column or other infrastructure component of the environment 400, and includes a lower power communications interface for communicating with tape nodes within range of the stationary gateway 414 and a higher power communications interface for communicating with the network 402. In one embodiment, each of the tape nodes 442-448 is a peripheral tape node and is configured by the network service 408 to communicate individually with the stationary gateway 414, which relays communications from the tape nodes 442-448 to the network service 408 through the stationary gateway 414 and over the communications network 402. In another embodiment, one of the tape nodes 442-448 at a time is configured as a master tape node that transmits, forwards, relays, or otherwise communicate wireless messages to, between, or on behalf of the other tape nodes on the pallet 458. In this embodiment, the master tape node may be determined by the tape nodes 442-448 or designated by the network service 408. In some examples, the tape node with the longest range or highest remaining power level is determined to be the master tape node. In some examples, when the power level of the current master tape node drops below a certain level (e.g., a fixed power threshold level or a threshold level relative to the power levels of one or more of the other tape nodes), another one of the tape nodes assumes the role of the master tape node. In some examples, a master tape node 459 is adhered to the pallet 458 and is configured to perform the role of a master node for the tape nodes 442-448. In these ways, the tape nodes 442-448, 458 are configurable to create different hierarchical wireless networks of nodes for transmitting, forwarding, relaying, bridging, or otherwise communicating wireless messages with the network service 408 through the stationary gateway 414 and over the network 402 in a power-efficient and cost-effective way.

In the illustrated example, the stationary gateway 414 also is configured by the network service 408 to communicate with a designated set of tape nodes, including a master tape node 460 that is adhered to the inside of a door 462 of a shipping container 464, and is further configured to communicate with the network service 408 over the network 402. In the illustrated example, the shipping container 464 contains a number of parcels labeled or sealed by respective peripheral tape nodes 466 and containing respective assets. The master tape node 416 communicates with each of the peripheral tape nodes 466 and communicates with the stationary gateway 415 in accordance with a hierarchical wireless network of tape nodes. In some examples, each of the peripheral tape nodes 466 includes a lower power wireless communications interface of the type used in, e.g., tape node 102 (shown in FIG. 5A), and the master tape node 460 is implemented by a tape node (e.g., tape node 103, shown in FIG. 5B) that includes a lower power communications interface for communicating with the peripheral tape nodes 466 contained within the shipping container 464, and a higher power communications interface for communicating with the stationary gateway 414.

In some examples, when the doors of the shipping container 464 are closed, the master tape node 460 is operable to communicate wirelessly with the peripheral tape nodes 466 contained within the shipping container 464. In an example, the master tape node 460 is configured to collect sensor data from the peripheral tape nodes and, in some embodiments, process the collected data to generate, for example, one or more histograms from the collected data. When the doors of the shipping container 464 are open, the master tape node 460 is programmed to detect the door opening (e.g., with an accelerometer component of the master tape node 460) and, in addition to reporting the door opening event to the network service 408, the master tape node 460 is further programmed to transmit the collected data and/or the processed data in one or more wireless messages to the stationary gateway 414. The stationary gateway 414, in turn, is operable to transmit the wireless messages received from the master tape node 460 to the network service 408 over the wireless network 402. Alternatively, in some examples, the stationary gateway 414 also is operable to perform operations on the data received from the master tape node 460 with the same type of data produced by the master node 459 based on sensor data collected from the tape nodes 442-448. In this way, the master tape node 460 and the peripheral tape nodes 466 create a hierarchical wireless network of nodes for transmitting, forwarding, relaying, or otherwise communicating wireless messages to, between, or on behalf of the peripheral tape nodes 466 and the network service 408 in a power-efficient and cost-effective way.

In an example of the embodiment shown in FIG. 9, there are three classes of tape nodes: a short range tape node, a medium range tape node, and a long range tape node, as respectively shown in FIGS. 5A-5C. The short range tape nodes typically are adhered directly to parcels containing assets. In the illustrated example, the tape nodes 418, 428, 432, 442-448, 466 are short range tape nodes. The short range tape nodes typically communicate with a low power wireless communication protocol (e.g., Bluetooth LE, Zigbee, or Z-wave). The medium range tape nodes typically are adhered to objects (e.g., a box 426 and a shipping container 460) that are associated with multiple parcels that are separated from the medium range tape nodes by a barrier or a large distance. In the illustrated example, the tape nodes 424 and 460 are medium range tape nodes. The medium range tape nodes typically communicate with a medium power wireless communication protocol (e.g., LoRa or Wi-Fi). The long-range tape nodes typically are adhered to mobile or stationary infrastructure of the wireless communication environment 400. In the illustrated example, the mobile gateway tape node 412 and the stationary gateway tape node 414 are long range tape nodes. The long range tape nodes typically communicate with other nodes using a high power wireless communication protocol (e.g., a cellular data communication protocol). In some examples, the mobile gateway tape node 436 is adhered to a mobile vehicle (e.g., a truck). In these examples, the mobile gateway 412 may be moved to different locations in the environment 400 to assist in connecting other tape nodes to the server 404. In some examples, the stationary gateway tape node 414 may be attached to a stationary structure (e.g., a wall) in the environment 400 with a known geographic location. In these examples, other tape nodes in the environment can determine their geographic location by querying the gateway tape node 414.

Figure 10:
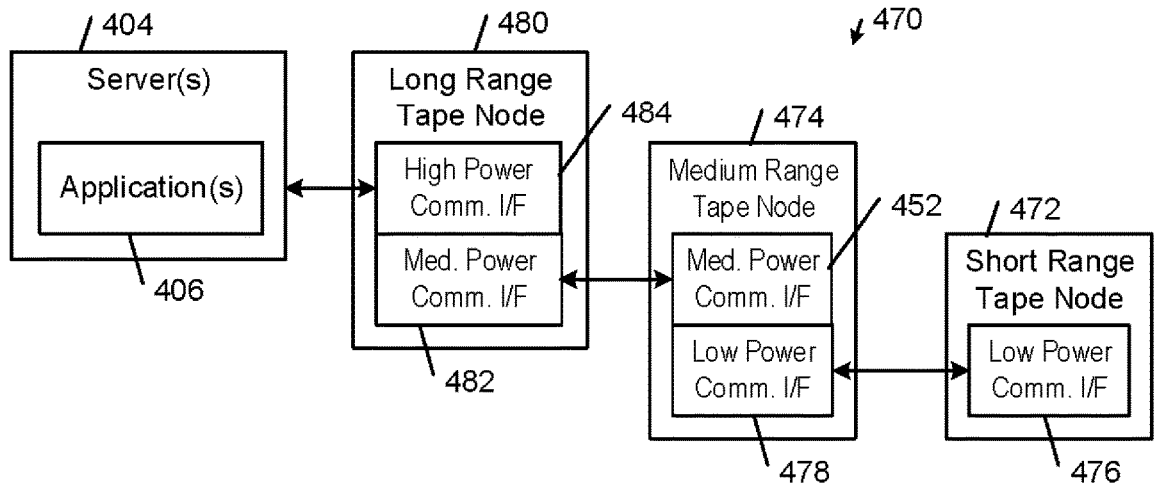
FIG. 10 is a diagrammatic view of a hierarchical communications network.

FIG. 10 shows an example hierarchical wireless communications network of tape nodes 470. In this example, the short range tape node 472 and the medium range tape node 474 communicate with one another over their respective low power wireless communication interfaces 476, 478. The medium range tape node 474 and the long range tape node 480 communicate with one another over their respective medium power wireless communication interfaces 478, 482. The long range tape node 480 and the network server 404 communicate with one another over the high power wireless communication interface 484. In some examples, the low power communication interfaces 476, 478 establish wireless communications with one another in accordance with the Bluetooth LE protocol, the medium power communication interfaces 452, 482 establish wireless communications with one another in accordance with the LoRa communications protocol, and the high power communication interface 484 establishes wireless communications with the server 404 in accordance with a cellular communications protocol.

In some examples, the different types of tape nodes are deployed at different levels in the communications hierarchy according to their respective communications ranges, with the long range tape nodes generally at the top of the hierarchy, the medium range tape nodes generally in the middle of the hierarchy, and the short range tape nodes generally at the bottom of the hierarchy. In some examples, the different types of tape nodes are implemented with different feature sets that are associated with component costs and operational costs that vary according to their respective levels in the hierarchy. This allows system administrators flexibility to optimize the deployment of the tape nodes to achieve various objectives, including cost minimization, asset tracking, asset localization, and power conservation.

In some examples, a server 404 of the network service 408 designates a tape node at a higher level in a hierarchical communications network as a master node of a designated set of tape nodes at a lower level in the hierarchical communications network. For example, the designated master tape node may be adhered to a parcel (e.g., a box, pallet, or shipping container) that contains one or more tape nodes that are adhered to one or more packages containing respective assets. In order to conserve power, the tape nodes typically communicate according the a schedule promulgated by the server 404 of the network service 408. The schedule usually dictates all aspects of the communication, including the times when particular tape nodes should communicate, the mode of communication, and the contents of the communication. In one example, the server 404 transmits programmatic Global Scheduling Description Language (GSDL) code to the master tape node and each of the lower-level tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the server network node 404, either directly or indirectly through a gateway tape node (e.g., the long range tape node 416 adhered to the mobile vehicle 412 or the long range tape node 414 adhered to an infrastructure component of the environment 400). In other examples, the master tape node processes the information contained in the received data packets and transmits the processed information to the server network node 404.

Figure 11:
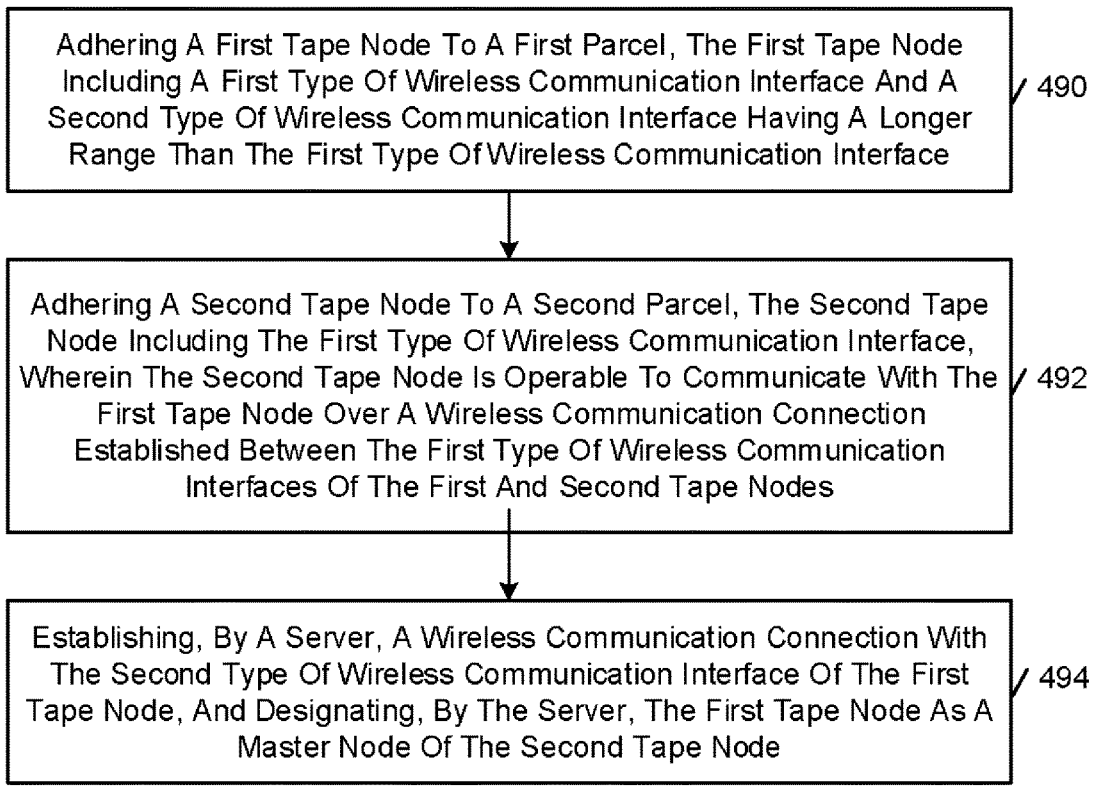
FIG. 11 is a flow diagram of a method of creating a hierarchical communications network.

FIG. 11 shows an example method of creating a hierarchical communications network. In accordance with this method, a first tape node is adhered to a first parcel in a set of associated parcels, the first tape node including a first type of wireless communication interface and a second type of wireless communication interface having a longer range than the first type of wireless communication interface (FIG. 11, block 490). A second tape node is adhered to a second parcel in the set, the second tape node including the first type of wireless communication interface, wherein the second tape node is operable to communicate with the first tape node over a wireless communication connection established between the first type of wireless communication interfaces of the first and second tape nodes (FIG. 11, block 492). An application executing on a computer system (e.g., a server 404 of a network service 408) establishes a wireless communication connection with the second type of wireless communication interface of the first tape node, and the application transmits programmatic code executable by the first tape node to function as a master tape node with respect to the second tape node (FIG. 11, block 494).

Additional cost reductions can be achieved through the use of sampling tapes. As explained above in connection with FIGS. 6A-6D, some logistics applications do not require tracking and/or sensor data for every parcel shipped. Instead, sufficient information for decision-making can be obtained by collecting data from a sample of the packages shipped. In these examples, a substantial reduction in tape node costs can be realized by selecting a sampling density of the deployed wireless transducing circuits 70 that achieves a target tracked package sampling rate that is less than unity. In these embodiments, some packages would not be tracked or monitored. However, the sample size can be selected to be sufficient to make inferences about a group of packages shipped with a desired level of accuracy.

IV. Scheduling Communications

As explained above, in some examples, the active components of the adhesive tape platform are activated (e.g., connected to the embedded power source) when a segment of the adhesive tape platform is cut (e.g., along a cut line) or when a segment of the adhesive tape platform is removed from a backing sheet. In these examples, there is no off-switch or sleep switch; instead, the resulting tape nodes remain activated until their respective power sources are depleted, at which point the power sources no longer power the active components thereby rendering the tape nodes non-functional until the power sources are replenished (e.g., by wireless charging, capacitive charging, or energy harvesting).

Although the tape nodes are relatively inexpensive compared to existing network technologies, it is still possible to manage and ideally reduce operational costs (e.g., wireless communications costs, such as cellular service costs) and maintenance costs (e.g., tape node and other infrastructure replacement costs). To this end, the network service 408 generates wireless transmission schedules specifying the times or conditions when the tape nodes at one level in the communication hierarchy should transmit their data packets up to the next level in the communication hierarchy. In this way, tape node power is conserved and wireless subscription usage is reduced compared to existing approaches. The problem of finding an optimal schedule can be formulated as an optimization problem with battery capacity of nodes, power consumption in various modes of operation, desired latency, external environment etc. and can be solved using modern optimization methods e.g. neural networks, artificial intelligence, and other machine learning computing systems that take expected and historical data to create an optimal solution and can create algorithms for modifying the schedule adaptively in the field.

In some examples, the communications are scheduled using a subset of the control code that is referred to herein as the "Global Scheduling Description Language" (GSDL) code. In these examples, the server 404 is configured to transmit a respective subset of the GSDL code to each tape node, where the respective GDSL code is stored in the standalone memory 96 and/or a memory component of the processor 90 in the respective wireless transducer circuit 70 of the respective tape node (see, e.g., FIG. 3). The GDSL code that is stored in memory is executed by the processor 90 of the tape node to programmatically perform one or more operations or tasks according to a specific schedule based on, for example, a specified time or upon satisfaction of one or more conditions or occurrence of one or more events.

The following is pseudo-code for an example of a GSDL programmatic control language instruction:

Take Action (X1, X2, . . . , XN) on Trigger (Y1, Y2, . . . , YM)

where (X1, X2, . . . , XN) refer to a sequence of one or more actions that the tape node will take in response to satisfaction of the one or more triggers (Y1, Y2, . . . , YM). A specific pseudo-code example of the GSDL code: Transmit Alarm_Type_1 on Measurement of Average_Temperature>65.0 degrees Fahrenheit from 30 measurements once per second for 30 seconds. Another pseudo-code example of the GSDL code: Transmit Temperatures of Box_1567 on Trigger GSP of Tape_Node_4357 is less than 5 kilometers away from Port_Y.

In general, the Action can be any action that can be performed by one or more components of a tape node, including one or more of the following actions: obtain data from a sensor; generate physical stimulus locally with a transducer component of the tape node; and transmit data packets to the network service. For example, a tape node may transmit a generic or type-specific alarm condition packet to the network service. In another example, a tape node may generate an alarm sound from a speaker component of the tape node or generate a flashing light from a light source component of the tape node. The trigger can be, for example, any type of phenomenon, data, or event that a tape node can determine, detect, or otherwise respond to, including one or more of the following triggers: time; event frequency; temperature; acceleration; deceleration; geographic location (e.g., GPS coordinates); and events associated with other tape nodes.

In a one example, a particular tape node includes a sensor (e.g., a temperature sensor) and the processor 90 executes programmatic GSDL code stored in a memory component of the particular tape node to activate the temperature sensor at a first time (e.g., 8 am PST) and record the sensed temperature data in memory 96 for a specified duration (e.g., 30 seconds) or a specified number of samples. At a second specified time (e.g., 11 pm PST), the processor 90 executes programmatic GSDL code to establish a connection with another node (e.g., a master tape node 424, 460 or a gateway 412, 420) that is configured to relay (or bridge) the data packets from the tape node to the network service 408, and then transmit one or more data packets containing the sensed temperature data to the network service 408 over the established connection.

In some examples, one or more human operators deploy tape nodes, gateway nodes, and other network communication infrastructure in a particular venue (e.g., a warehouse, a port, a loading dock, or other logistic location). In some examples, the network service 408 initializes a respective network for each venue by distributing portions of GSDL code to the respective nodes in the network, including peripheral tape nodes, medium range master tape nodes, long range master tape nodes, and master gateway nodes. In this process, one or more servers 404 of the network service 408 directs the transmission of the GSDL code portions through the network hierarchy from the top level nodes down to the bottom level peripheral nodes, where designated master nodes at the higher levels in the hierarchy manage and distribute the GSDL code portions to respective designated subsets of the nodes at lower levels in the hierarchy. The GSDL code portions program the nodes in the hierarchical communications network with respective schedules of all the communication and processing events that are relevant to the particular nodes. In this way, the network service 408 schedules all the events globally and directs the distribution of the respective GSDL code portions locally to each of the nodes through one or more master nodes at higher levels in the hierarchy. The network service 408 also can transmit GSDL code that changes, modifies or deletes the existing programmatic schedule of events for a particular node (e.g., when the schedule for the particular node changes).

After the GSDL code portions have been distributed to the respective nodes, the nodes typically synchronize their respective clocks and/or timers. The clocks and timers may be synchronized in any of a variety of conventional ways, including transmitting a periodic heartbeat communication between nodes (e.g., between a master node and one or more peripheral nodes in a designated logistic group), sending a series of packets containing synchronizing time stamp data for other nodes, and exchanging time stamps to determine and correct delays between nodes.

In one example, a master tape node associated with peripheral tape nodes in a designated logistic group (e.g., tape nodes adhered to respective parcels in a grouped set being shipped to the same destination) is configured to detect improper removals from the logistic group. In this example, the master tape node detects the presence of each peripheral tape node in the logistic group by transmitting ping packets to the peripheral tape nodes according to a schedule prescribed in the programmatic GSDL code portions installed in the memory of the master tape node (e.g., once every 10 minutes or every hour). If a peripheral tape node in the designated logistic group does not respond to a number of ping packets specified in the GSDL code portion stored in the master tape node, the master tape node logs the ID of the non-responsive peripheral tape node in its memory and reports the non-responsive peripheral tape node to a node at the next higher level in the communications hierarchy.

In another example, a master tape node associated with a designated logistic group of peripheral tape nodes is configured to detect improper consolidations into the logistic group. In this example, the master tape node periodically (e.g., every 10 minutes over every hour) sends a ping packet to each of the peripheral tape nodes and receives response packets from the pinged peripheral tape nodes according to a schedule prescribed in the programmatic GSDL code portions downloaded to the master and peripheral tape nodes. If the master tape node receives a response packet from a peripheral tape node that is not in the designated logistic group, the master tape node logs information that identifies the peripheral tape node in memory and reports the improper inclusion of the identified peripheral tape node a node at the next higher level in the communications hierarchy.

In some examples, tape nodes are configured to switch roles from a peripheral tape node to a master tape node and vice versa in response to particular criteria defined in their respective GSDL code portions. In these examples, a designated logistic group consists of a current master tape node and one or more peripheral tape nodes. In an example, the tape nodes are adhered to respective parcels in a grouped set being shipped to the same destination. The current master tape node periodically (e.g., every 10 minutes over every hour) sends a ping packet to each of the peripheral tape nodes in the logistic group and receives response packets from the pinged peripheral tape nodes according to a schedule prescribed in the programmatic GSDL code portions downloaded to the master and peripheral tape nodes. The current master tape node logs information that identifies peripheral tape nodes that fail to respond to a designated number of pings and responses from peripheral tape nodes that are not identified in the designated logistic group. The current master tape node also periodically queries the battery levels of the peripheral tape nodes in the logistic group and reports the battery levels of the peripheral tape nodes as well as its own battery level to a server 404 of the network service 408. Based on the respective battery levels of the tape nodes, the network service 408 determines whether to demote the current master tape node to a peripheral tape node role and promote one of the peripheral tape nodes to the current master tape node role. In an example, the network service 408 demotes the current master tape node to peripheral tape node status if its battery level is below 20% of its original capacity and promotes the peripheral tape node that has the higher battery level greater than 20% to master node status. In another example, the network service 408 designates the tape node having the highest battery level as the current master tape node.

V. Distributed Data Processing

As explained above, once they are deployed and initialized, the tape nodes constitute a hierarchical sensor network that includes a bottom level of peripheral tape nodes that typically are associated with and configured with respective sensors to monitor respective assets (e.g., parcels, persons, tools, equipment, infrastructure, and other physical assets and objects), and additionally includes one or more higher levels of tape nodes (e.g., master tape nodes and gateways) that are configured to communicate with the lower level nodes and also may be configured with respective sensors.

In some examples, after collecting sensor data according to its installed GSDL code, a sensor tape node will transmit the collected data in one or more data packets to a server node 404 of the network service 408 through one or more tape nodes at one or more higher levels in the communications hierarchy. In these examples, the one or more server network nodes 404 of the network service 408 processes the received data to generate analytics providing visibility at different levels in the hierarchical sensor network. However, in order to achieve real-time or near real-time monitoring performance, this approach requires each tape node to transmit a significant amount of data, which imposes a significant drain on the tape nodes power sources that significantly reduces the lives of the tape nodes.

In other examples, the tape nodes themselves are capable of processing sensor data and aggregating the processed sensor data locally, thereby significantly reducing the amount of data that needs to be transmitted by the tape nodes and greatly extending their useful lifetimes. In an example, a peripheral tape node collects a set of sensor data of a particular type (e.g., location, capacitance, altitude, orientation, acceleration, temperature, strain, pressure, shock, vibration, weight, light, sound, smoke, radioactivity, chemicals, magnetism, electromagnetism, and humidity). The peripheral tape node processes (e.g., aggregates) the collected data to generate a compressed representation of the data, for example, a histogram of the processed data over a range variable (e.g., time, location, parcel identifier, tape node type, etc.). Instead of transmitting the original collected data, the peripheral tape node transmits the compressed representation of the processed data (e.g., the range values and bin counts) to the associated master node at the next level up in the communication hierarchy (e.g., the box, pallet, or container level). The master node, in turn, combines the compressed representations of the data collected from multiple of the associated peripheral tape nodes to generate analytics at the box, pallet, or container level. The aggregation process continues up through the hierarchy to obtain visibility into each level. In addition to transmission of the compressed data up in the hierarchy for decision-making at higher hierarchical levels, each tape node is also capable of analyzing the collected data, compressing the results, and making certain decisions locally within the node. In some examples, a tape node calculates statistics from the collected data, analyzes the calculated statistics against one or more criteria, and takes an action in response to the results of the analysis. For example, the tape node may produce a audible alarm of transmit an alarm data packet to the network service 408 in response to a determination that there has been a temperature violation with respective to a particular parcel.

Figure 12:
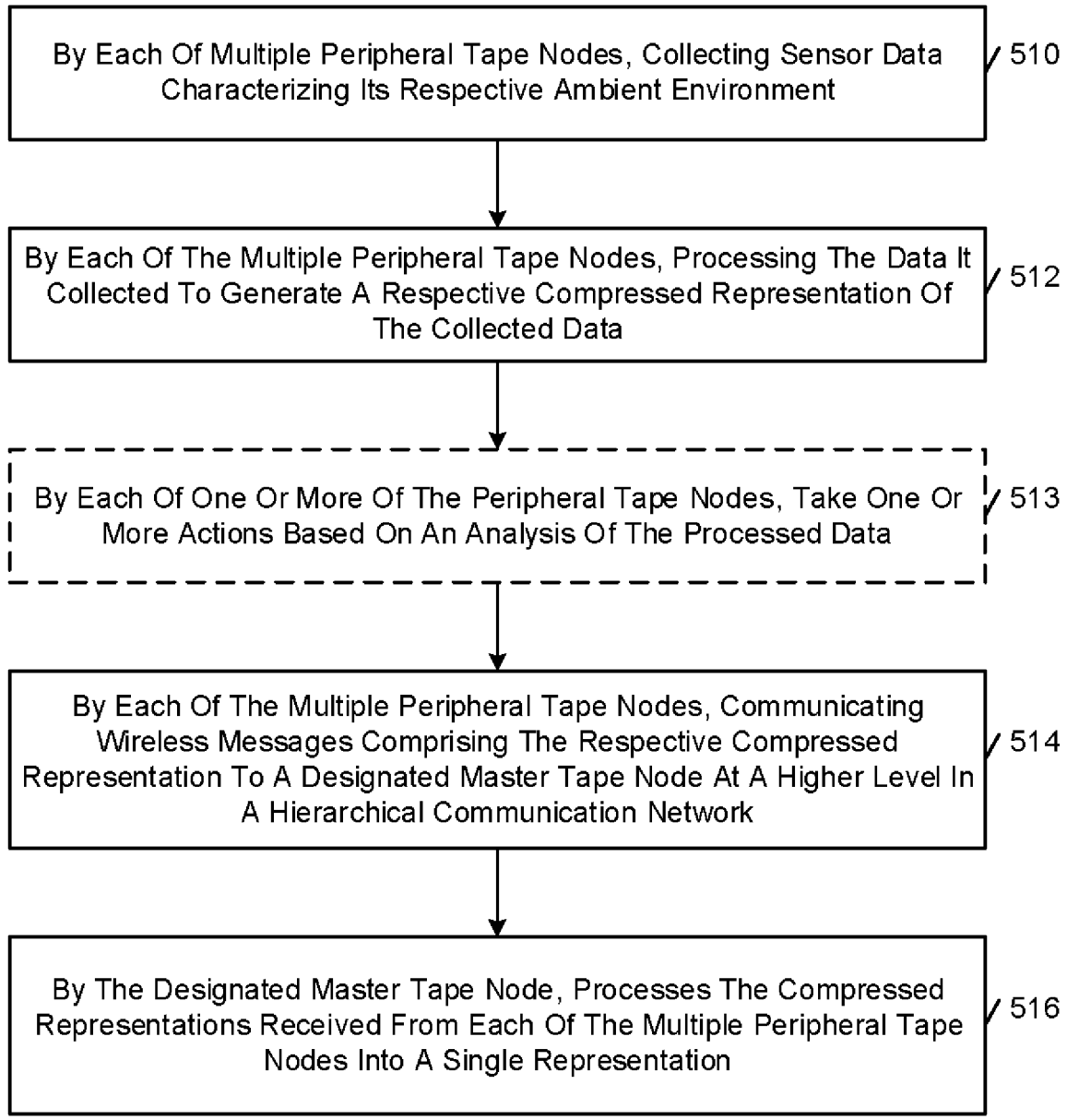
FIG. 12 is a flow diagram of a distributed method of processing sensor data by hierarchal arrangement of wireless communication devices.

FIG. 12 shows an example process by which multiple tape nodes perform distributed computing of sensor data. Each peripheral tape node collects sensor data characterizing its respective ambient environment (FIG. 12, block 510). Each peripheral tape node processes the respective data that it collected to generate a respective compressed representation of the collected data (FIG. 12, block 512). In some examples, one or more of the tape nodes are programmed to autonomously take one or more actions based on an analysis of the processed data (FIG. 12, block 513). Each peripheral tape node communicates one or more wireless messages including the respective compressed representation to a designated master tape node at a higher level in the hierarchical communication network (FIG. 12, block 514). The designated master tape node processes the compressed representation received from each of the multiple peripheral tape nodes into a single representation (FIG. 12, block 516).

Tape nodes may be configured to generate statistics for phenomena other than the ambient conditions of parcels and other containment units. In some examples, a master tape node generates analytics regarding improper splits or separations from designated logistic groups of tape nodes and improper consolidations into designated logistic groups of tape nodes. In an example, a master tape node associated with multiple designated logistic groups of peripheral tape nodes generates analytics (e.g., the frequency of improper splits or separations of assets from the designated logistic group) for a particular logistic entity. In another example, a master tape node is associated with multiple designated logistic groups of peripheral tape nodes generates analytics (e.g., the frequency of improper consolidation of assets with the designated logistic group) for a particular logistic entity.

Figure 13:
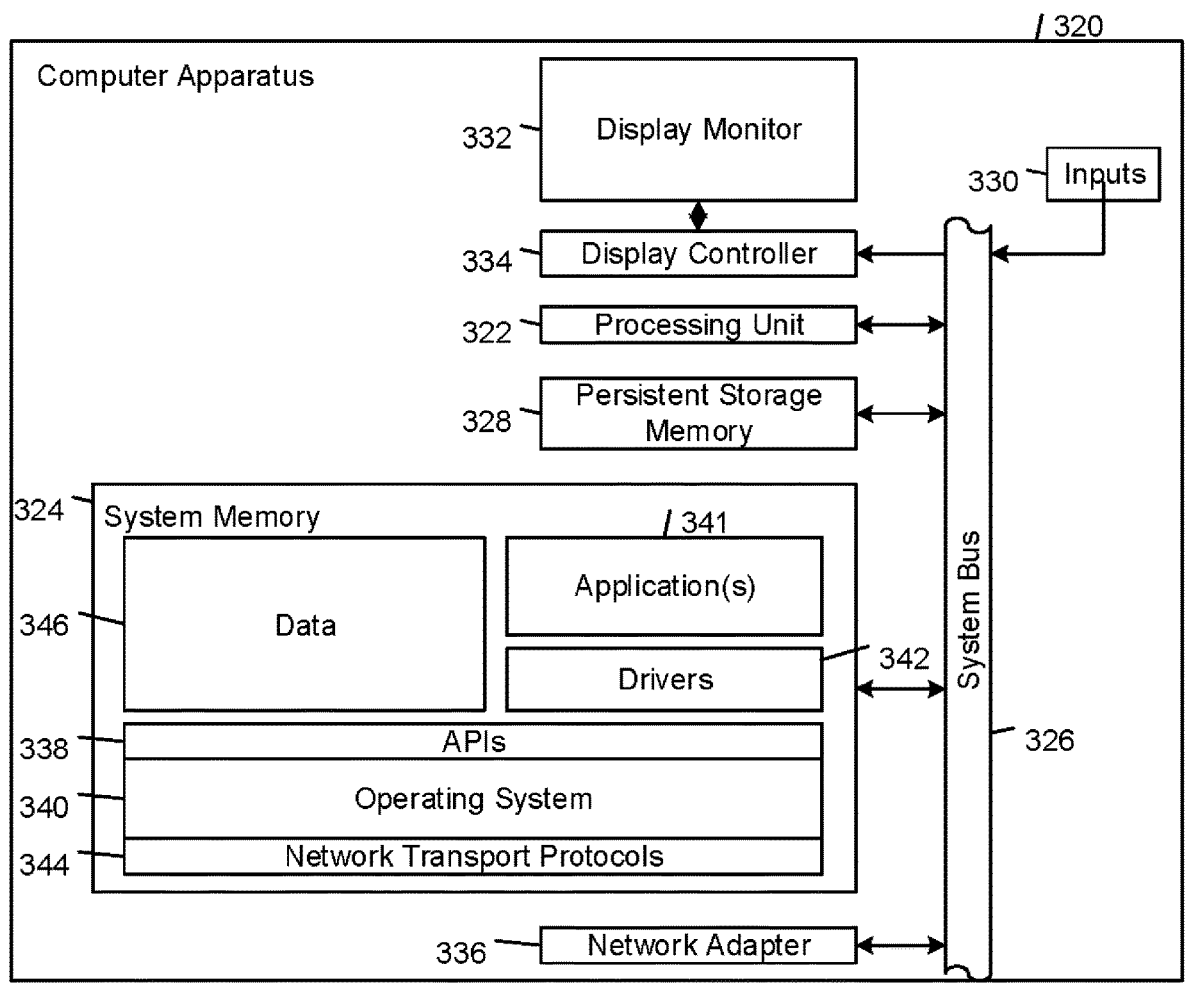
FIG. 13 is a block diagram of an example computer apparatus.

FIG. 13 shows an example embodiment of computer apparatus 320 that, either alone or in combination with one or more other computing apparatus, is operable to implement one or more of the computer systems described in this specification.

The computer apparatus 320 includes a processing unit 322, a system memory 324, and a system bus 326 that couples the processing unit 322 to the various components of the computer apparatus 320. The processing unit 322 may include one or more data processors, each of which may be in the form of any one of various commercially available computer processors. The system memory 324 includes one or more computer-readable media that typically are associated with a software application addressing space that defines the addresses that are available to software applications. The system memory 324 may include a read only memory (ROM) that stores a basic input/output system (BIOS) that contains start-up routines for the computer apparatus 320, and a random access memory (RAM). The system bus 326 may be a memory bus, a peripheral bus or a local bus, and may be compatible with any of a variety of bus protocols, including PCI, VESA, Microchannel, ISA, and EISA. The computer apparatus 320 also includes a persistent storage memory 328 (e.g., a hard drive, a floppy drive, a CD ROM drive, magnetic tape drives, flash memory devices, and digital video disks) that is connected to the system bus 326 and contains one or more computer-readable media disks that provide non-volatile or persistent storage for data, data structures and computer-executable instructions.

A user may interact (e.g., input commands or data) with the computer apparatus 320 using one or more input devices 330 (e.g. one or more keyboards, computer mice, microphones, cameras, joysticks, physical motion sensors, and touch pads). Information may be presented through a graphical user interface (GUI) that is presented to the user on a display monitor 332, which is controlled by a display controller 334. The computer apparatus 320 also may include other input/output hardware (e.g., peripheral output devices, such as speakers and a printer). The computer apparatus 320 connects to other network nodes through a network adapter 336 (also referred to as a "network interface card" or NIC).

A number of program modules may be stored in the system memory 324, including application programming interfaces 338 (APIs), an operating system (OS) 340 (e.g., the Windows® operating system available from Microsoft Corporation of Redmond, Wash. U.S.A.), software applications 341 including one or more software applications programming the computer apparatus 320 to perform one or more of the steps, tasks, operations, or processes of the locationing and/or tracking systems described herein, drivers 342 (e.g., a GUI driver), network transport protocols 344, and data 346 (e.g., input data, output data, program data, a registry, and configuration settings).

Examples of the subject matter described herein, including the disclosed systems, methods, processes, functional operations, and logic flows, can be implemented in data processing apparatus (e.g., computer hardware and digital electronic circuitry) operable to perform functions by operating on input and generating output. Examples of the subject matter described herein also can be tangibly embodied in software or firmware, as one or more sets of computer instructions encoded on one or more tangible non-transitory carrier media (e.g., a machine readable storage device, substrate, or sequential access memory device) for execution by data processing apparatus.

The details of specific implementations described herein may be specific to particular embodiments of particular inventions and should not be construed as limitations on the scope of any claimed invention. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

VI. Security and Tape Infrastructure

As mentioned earlier, communications among tapes nodes, the communication is secured through a custom security mechanism. In certain cases, tape nodes can also be configured to support block chain to protect the transmitted and stored data. However, the Block Chain implementation differs from the conventional block chain used in the industry e.g. Crypto Currency. Tape application uses a concept of distributed block-chains. The components of distributed block chains are described below.

1. Parallel Non-Communicating Block Chains of Independent Clusters of Transactions Standard block chains needs to store the complete transaction history (distributed across all nodes) because the final balances for each public key depend on the cumulative effect of all previous transactions. This causes significant memory issues if you want to apply the standard block chain in tape application. However, unlike the currency application, not every transaction is dependent upon each other in a way that affects the cumulative outcome.

In the Tape environment, we define a graph where the nodes are transactions among tapes and the edges define dependencies between these transactions. For example, transactions can have dependencies because the underlying process competes for the same resources (e.g., a container). However, instead of defining the graph with each tape being a node, we identify cluster of tapes that are independent using graph algorithm and define the nodes of the graphs to be clusters. Every cluster will need to have a certain number of nodes though to have enough cross checking within the distributed network. Example of a cluster is a trucker loads 5 boxes, then the trucker unloads 3 boxes at location A and then unloads 1 box in location B and then claims no boxes left. An improved algorithm would be to define the independent clusters of minimal number of nodes for cross checking effectiveness as done in standard packing algorithms.

2. Block Chain Transaction Time Arbitrage & Block Queue

Block chain in the traditional applications (e.g. Crypto Currencies) is optimized for transaction completion time, which relies on the proof of work of the whole network as a way to beat any individual hacker, and hence requires a lot of time. This is important in those applications because it is a currency (time=money; trading). Moreover, you want to prevent double spending (so you need to wait till the distributed network of chain copies are stabilized and everybody agrees before you allow spending the money you just received).

However, in tape application, transaction time is actually less important as long as we queue them up and secure them against hackers (which can be done using basic encryption onboard of our tape). The actual mining to tie the transactions into a chain (i.e., the computational intensive part) and stabilize the distributed network can be done at a time when the cost of doing these activities is cheaper (in terms of battery life or storage). We can store the blocks or transactions in a queue (encrypted) and schedule processing them in an efficient matter.

3. Communicating Hierarchical Block Chains of Clusters of Transactions

The ability to arbitrage transaction time enables other useful features. In tape environment, not all tapes are accessible every point in time. We can schedule interaction time to communicate (in a secure matter) between multiple levels of block-chains. This guarantees security at higher levels of abstractions. The hierarchy of block chains can be optimized to reduce memory and computational requirements at lower levels while reducing latency in terms of due diligence requests (e.g., because parties in the logistics chain disagree). For example, our infrastructure components (such as the stationary and mobile gateway) can run a higher level abstraction block chain both from a storage perspective as well as from a computational perspective (e.g. the system can have three levels: the tape, mobile gateways like 412 in FIG. 9, and stationary gateways (414 in FIG. 9) that are always connected.

4. Lossless Block chain Storage Compression of (Partial) Dependent Clusters

Communicating hierarchical block chains enable more features. After details are communicated to a higher-level block chain in a secure matter, the lower level block chains are compressed where dependent clusters of transactions are stored only a hash (i.e., not the actual details) called compressed transaction cluster. The higher level still stores the actual details. This reduces the need to store all dependent transactions at every level while still guaranteeing same security & resilience. The actual transactions are lost at the lower block chain but still can be recovered at the higher-level block chain.

5. Lossy Block Chain Compression of Dependent Clusters

Another advantage of transaction time arbitrage and dependent clusters of transactions is that when all parties involved in a dependent cluster of transactions agree on the successful completion of the dependent set of transactions, then we then don't need to store the cluster anymore (not in lower level block chains nor higher level block chains). Note that these events can happen many times before the tape actually gets shipped from A to B. The chains can be pruned to get rid of data and replace it with a completion flag (to keep security).

6. Memory Overflow Resolution

In order to limit the memory overflow issues in tape application, where available memory is limited, an optimization algorithm is used to find a global optimal solution would be analyzing the full graph of all transactions and assigning weights as to what the cost would be if a hacker would invalidates parts of this. The general optimization algorithm can be improved by analyzing dependent clusters independently (collapsing them based on certain threshold/compromises). As an example simple set of timers stored in the block chain capturing the number of completed dependent transactions may be one way to prioritize the branches to be pruned in the solution search space.

7. Centralized Mining Server

Another component of the distributed block chain system is the use of centralized mining server where tapes/nodes nodes can fetch useful puzzles from a server (or a hierarchy thereof). The distribution of these tasks can use the traditional SHA256 hash and block chain to secure the data.

8. Tape Block Chain API, OS, and Interposer Layer with a library of Third Party Block Chain APIs The Distributed block chains used in the tape environment are encapsulated at the API level and provide an interface to communicate with the existing block chain used in the industry.

Communicating hierarchical block chains make the tape the lowest common denominator and actually be the connecting tissue between different block chain standards. A generic block chain API and a wrapper framework that encapsulates third party block chain APIs allows tape distributed block chain to communicate with other block chain eco-systems. This creates an abstraction that allows tape Operating system (tape Logistics OS) to only interact with tape distributed block chain API.

ADDITIONAL EMBODIMENTS

The following is a listing of example sets of additional embodiments related to aspects of the embodiments described above. Each set of additional embodiments relates to one or more of asset monitoring, location management, and logistics in the context of wireless node communications and sensing networks.

Additional Embodiment 1—Scheduling Wireless Autonomous Tape Agents

1. A method of scheduling wireless autonomous tape agents in a hierarchy of levels, comprising:

by the wireless autonomous tape agents, synchronizing with respect to a timing reference;

propagating, by a master node, scheduling instructions in a global scheduling description language to the wireless autonomous tape agents in the hierarchy of levels, wherein the propagating comprises transmitting a respective subset of the global scheduling description language instructions in a preceding level in the hierarchy to each wireless autonomous tape agent in a successive level lower in the hierarchy, and repeating the transmitting for each successive level lower in the hierarchy; and executing, by the wireless autonomous tape agents, the respective instructions to create a monitoring network for packages.

2. The method of claim 1, wherein the propagating comprises restricting the propagation of global scheduling description language from a preceding level in the hierarchy to a successive lower level in the hierarchy to a subset of the global scheduling description language that is relevant to the wireless autonomous tape agents in the successive lower levels in the hierarchy.

3. The method of claim 1, wherein the timing reference is a timer component of the master node.

4. The method of claim 1, wherein the timing reference of a clock component of the master node.

5. The method of claim 1, wherein the propagating comprises, by the master node, transmitting global scheduling description language instructions to wake each of respective ones of the wireless autonomous tape agents.

6. The method of claim 5, wherein the global scheduling description language instructions comprise one or more of: an instruction specifying a schedule of wake times; an instruction specifying a wake up frequency; an instruction specifying a wake window; and an instruction specifying one or more wake up conditions.

7. The method of claim 6, wherein the one or more wake up conditions comprise one or more of an acceleration level above a threshold acceleration, a shock level above threshold shock level, and a temperature level above a threshold temperature level.

8. The method of claim 7, wherein respective ones of the wireless autonomous tape agents comprise accelerometers.

9. The method of claim 7, wherein respective ones of the wireless autonomous tape agents comprise shock sensors.

10. The method of claim 1, wherein the propagating comprises, by the master node, transmitting parameter values to configure respective ones of the wireless autonomous tape agents to perform operations.

11. The method of claim 1, further comprising:
grouping, by the master node, a set of packages each associated with a respective wireless autonomous tape agent;
designating, by the master node, one of the wireless autonomous tape agents as a master wireless autonomous tape agent and designating other ones of the wireless autonomous tape agents as peripheral wireless autonomous tape agents; and
switching, by the master wireless autonomous tape agent, the peripheral wireless autonomous tape agents into a low-power mode.

12. The method of claim 11, further comprising, by the master node, waking a selected one of the peripheral wireless autonomous tape agents from the low-power mode and designating the selected peripheral wireless autonomous tape agent as a current master wireless autonomous tape agent.

13. The method of claim 12, further comprising, by the master node, configuring the selected peripheral wireless autonomous tape agent with coded instructions to operate as a master wireless autonomous tape agent.

14. The method of claim 11, further comprising, by the master wireless autonomous tape agent, waking the peripheral wireless autonomous tape agents according to a wake schedule, detecting an unscheduled relative motion between the master wireless autonomous tape agent, and transmitting an alert based on detection of the unscheduled relative motion between the master wireless autonomous tape agent and any of the peripheral wireless autonomous tape agents above a threshold.

15. The method of claim 1, further comprising receiving, by a selected one of the wireless autonomous tape agents, global scheduling description language instructions defining an event, defining a response to the event, and performing the defined response based on detection of the event.

16. A system to schedule communications for wireless autonomous tape agents in a hierarchy of levels, comprising:
wireless autonomous tape agents operative to synchronize with respect to a timing reference;
a master node operative to propagate scheduling instructions in a global scheduling description language to the wireless autonomous tape agents in the hierarchy of levels, wherein the master node is operative to perform operations comprising transmitting a respective subset of the global scheduling description language instructions in a preceding level in the hierarchy to each wireless autonomous tape agent in a successive level lower in the hierarchy, and repeating the transmitting for each successive level lower in the hierarchy; and
the wireless autonomous tape agents are operative to execute the respective instructions to create a monitoring network for packages.

17. The system of claim 16, wherein the master node is operative to restrict the propagation of global scheduling description language from a preceding level in the hierarchy to a successive lower level in the hierarchy to a subset of the global scheduling description language that is relevant to the wireless autonomous tape agents in the successive lower levels in the hierarchy.

18. A computer program product for execution by a computer system and comprising at least one non-transitory computer-readable medium having computer-readable program code portions embodied therein, the computer-readable program code portions comprising:
an executable code portion to synchronize wireless autonomous tape agents with respect to a timing reference;
an executable code portion to propagate, by a master node, scheduling instructions in a global scheduling description language to the wireless autonomous tape agents in a hierarchy of levels, wherein the executable code portion to propagate comprises an executable code portion to transmit a respective subset of the global scheduling description language instructions in a preceding level in the hierarchy to each wireless autonomous tape agent in a successive level lower in the hierarchy, and repeating the transmitting for each successive level lower in the hierarchy; and
an executable code portion to execute, by the wireless autonomous tape agents, the respective instructions to create a monitoring network for packages.

Additional Embodiment 2—Bridging Autonomous Wireless Tape Agent Communications

1. A system for establishing a wireless communications connection between autonomous wireless tape agents and a remote server, comprising:
autonomous wireless tape agents adhered to stationary infrastructure and mobile assets within a physical premises environment;
a mobile vehicle carrying a wireless gateway comprising a first wireless communications interface to communicate with the remote server, and a second wireless communications interface to communicate with the autonomous wireless tape agents in the physical premises environment, wherein the second communications interface is operable to transmit one or more wakeup signals to wake the autonomous wireless tape agents in the physical premises environment, and the second communications interface is further operable to scan wireless signals transmitted by the autonomous wireless tape agents in the physical premises environment.

2. The system of claim 1, wherein the second communications interface is operable to transmit one or more wakeup signals to wake the autonomous wireless tape agents in the physical premises environment from a low-power mode of operation to a normal power mode of operation.

3. The system of claim 1, wherein the second communications interface is operable to transmit wakeup signals concurrently.

4. The system of claim 1, wherein the second communications interface is operable to transmit wakeup signals serially.

5. The system of claim 1, wherein the second communications interface is a single channel serial interface.

6. The system of claim 5, wherein autonomous wireless tape agents download respective non-interfering schedules of times to transmit data to the wireless gateway over the second communications interface.

7. The system of claim 1, wherein the wakeup signal concurrently wakes multiple of the autonomous wireless tape agents, and each autonomous wireless tape agent is configured to wait a random amount of time before transmitting data on the second communications interface.

8. The system of claim 1, wherein at least one of the autonomous wireless tape agents comprises a low-power radio that is awake while a primary radio remains off until it is awakened by the receipt of a wakeup packet by the low-power radio.

9. The system of claim 1, further comprising a stationary antenna associated with a serial communications interface in the physical premises environment, wherein the serial communications interface is operable to record serial communications interface data received from the autonomous wireless tape agents.

10. The system of claim 9, wherein the serial communications interface is operable to transmit the logged serial communications data to the second communications interface of the wireless gateway when the mobile vehicle is within range of the stationary antenna.

11. The system of claim 10, wherein the serial communications interface is a LoRaWAN interface.

12. A method of establishing a wireless communications connection between autonomous wireless tape agents and a remote server, comprising:
adhering autonomous wireless tape agents to stationary infrastructure and mobile assets within a physical premises environment;
carrying, by a mobile vehicle, a wireless gateway comprising a first wireless communications interface to communicate with the remote server;
by a second wireless communications interface, communicating with the autonomous wireless tape agents in the physical premises environment;
transmitting, by the second communications interface, one or more wakeup signals to wake the autonomous wireless tape agents in the physical premises environment; and
scanning, by the second communications interface, wireless signals transmitted by the autonomous wireless tape agents in the physical premises environment.

13. A system for establishing a wireless communications connection between autonomous wireless tape agents and a remote server, comprising:
autonomous wireless tape agents adhered to stationary infrastructure and mobile assets within a physical premises environment;
a mobile vehicle associated with a wireless gateway comprising by a first wireless communications interface, an executable code portion to communicate with the remote server;
by a second wireless communications interface, an executable code portion to communicate with the autonomous wireless tape agents in the physical premises environment;
an executable code portion to transmit, by the second communications interface, one or more wakeup signals to wake the autonomous wireless tape agents in the physical premises environment; and
an executable code portion to scan, by the second communications interface, wireless signals transmitted by the autonomous wireless tape agents in the physical premises environment.

Additional Embodiment 3—Programmable Network Nodes

1. A method of creating a hierarchical communications network, comprising:
adhering a first tape node to a first parcel in a set of associated parcels, the first tape node including a first type of wireless communication interface and a second type of wireless communication interface having a longer range than the first type of wireless communication interface;
adhering a second tape node to a second parcel in the set, the second tape node including the first type of wireless communication interface, wherein the second tape node is operable to communicate with the first tape node over a wireless communication connection established between the first type of wireless communication interfaces of the first and second tape nodes; and
establishing, by a master node executing an application, a wireless communication connection with the second type of wireless communication interface of the first tape node, and transmitting, by the application, programmatic code executable by the first tape node to function as a master tape node with respect to the second tape node.

2. The method of claim 1, further comprising, by the master node: instructing the first and second tape nodes to report their current respective battery levels; and determining whether to designate the second tape node as a master tape node of the first tape node based on the reported current respective battery levels.

3. The method of claim 2, further comprising, by the master node, designating the second tape node as the master tape node based on a determination that the current battery level of the first tape node is below a threshold battery level.

4. The method of claim 2, further comprising, by the master node, designating the second tape node as the master tape node based on a determination that the current battery level of the second tape node is higher than the current battery level of the first tape node.

5. The method of claim 1, further comprising, by the master node, transmitting programmatic code executable by the second tape node to detect and respond to an event.

6. The method of claim 5, wherein, based on execution of the programmatic code by the second tape node, performing operations comprising transmitting a wireless communication to an address of a third tape node adhered to an associated parcel in the set, and alerting the master node based on a failure of the second tape node to receive a responsive communication from the third tape node.

7. The method of claim 6, wherein the alerting comprises, by the second tape node, transmitting an alarm packet to the master tape node for transmission to the master node.

8. The method of claim 1, further comprising designating, by the master node, the first tape node as a master tape node with respect to a third tape node adhered to an associated parcel in the set.

9. The method of claim 8, wherein each of the second and third tape nodes comprises a respective sensor; and further comprising, by the second and third tape nodes, respectively collecting local parcel condition data and processing the collected local parcel condition data to produce respective processed parcel condition data sets.

10. The method of claim 9, wherein each of the respective processed parcel condition data sets comprises data values of a respective histogram.

11. The method of claim 9, further comprising, by the second and third tape nodes, transmitting the respective processed parcel condition data sets to the designated master tape node; and further comprising, by the designated master tape node, processing the processed parcel condition data sets to produce a combined processed data set.

12. The method of claim 11, wherein the combined processed parcel condition data sets comprises data values of a respective histogram.

13. A hierarchical communications network, comprising:
a first tape node adhered to a first parcel in a set of associated parcels, the first tape node including a first type of wireless communication interface and a second type of wireless communication interface having a longer range than the first type of wireless communication interface;
a second tape node adhered to a second parcel in the set, the second tape node including the first type of wireless communication interface, wherein the second tape node is operable to communicate with the first tape node over a wireless communication connection established between the first type of wireless communication interfaces of the first and second tape nodes; and
a master node operable to execute an application to perform operations comprising establishing a wireless communication connection with the second type of wireless communication interface of the first tape node, and designating, by the application, the first tape node as a master tape node with respect to the second tape node.

14. A method of creating a hierarchical communications network, comprising:
activating a first tape node and adhering it to a first parcel in a set of associated parcels, the first tape node comprising a first type of wireless communication interface and a second type of wireless communication interface having a longer range than the first type of wireless communication interface;
activating second and third tape nodes and respectively adhering them to second and third parcels in the set of associated parcels, the second and third tape nodes each comprising the first type of wireless communication interface and a respective sensor, wherein each of the second and third tape nodes is operable to communicate with the first tape node over a wireless communication connection established between the first type of wireless communication interfaces of the first, second, and third tape nodes;
by a master node executing an application, transmitting to each of the second and third tape node programmatic code for detecting and responding to an event.

15. The method of claim 14, wherein, based on the programmatic code, the second tape node performs operations comprising transmitting a wireless communication to an address of the third tape node, and alerting the master node based on a failure of the second tape node to receive a responsive communication from the third tape node.

16. The method of claim 15, wherein the alerting comprises, by the second tape node, transmitting an alarm packet to the master tape node for transmission to the master node.

17. The method of claim 14, further comprising transmitting, by the master node, programmatic code instructing the second and third tape nodes to perform operations comprising using their respective sensors to collect local parcel condition data and processing the collected local parcel condition data to produce respective processed parcel condition data sets.

18. The method of claim 17, further comprising transmitting, by the master node, programmatic code enabling the first tape node to perform operations comprising functioning as a master tape node of the second and third tape nodes, and processing the processed parcel condition data sets to produce combined processed parcel condition data set.

19. The method of claim 18, wherein the aggregated processed parcel condition data sets comprise data values of a respective histogram.

Additional Embodiment 4—One-Time Wake Circuit

1. A wireless communication device, comprising:
an antenna;
a wireless communication system;
a processor coupled to the wireless communication system;
an energy source;
a one-time wake circuit that can be awoken only one time and thereby create a persistent unimpeded connection between the energy source and each of the processor and the wireless communication system;
at least one non-transitory processor readable medium comprising programmatic code which, when executed by the processor, configures the processor to perform operations comprising controlling the wireless communication system to communicate wireless messages with one or more other network nodes during respective communication windows specified in the processor readable medium.

2. The wireless communication device of claim 1, wherein at least one of the communication windows is defined based on a pre-existing schedule of events.

3. The wireless communication device of claim 1, wherein at least one of the communication windows is associated with a respective definition of an event occurrence of which triggers the wireless communication device to transmit one or more wireless messages to at least one other wireless network node.

4. The wireless communication device of claim 3, wherein the event definition comprises one or more conditions on one or more data characterizing an ambient environment of the wireless communication device.

5. The wireless communication device of claim 4, further comprising a sensor and, when a pertinent portion of the programmatic code is executed by the processor, the processor performs operations comprising controlling the sensor to collect data characterizing the ambient environment of the wireless communication device.

6. The wireless communication device of claim 5, wherein the sensor comprises at least one of a location sensor, a capacitive sensor, an altimeter, a gyroscope, an accelerometer, a temperature sensor, a strain sensor, a pressure sensor, a piezoelectric sensor, a weight sensor, a light sensor, an acoustic sensor, a smoke detector, a radioactivity sensor, a chemical sensor, a biosensor, a magnetic sensor, an electromagnetic field sensor, and a humidity sensor.

7. The wireless communication device of claim 5, wherein the controlling of the wireless communication system to communicate and the controlling of the sensor to collect data are performed separately.

8. The wireless communication device of claim 5, further comprising processing the collected data characterizing the ambient environment of the wireless communication device to generate one or more statistics.

9. The wireless communication device of claim 8, wherein the one or more statistics comprise data values of a histogram.

10. The wireless communication device of claim 8, wherein the wireless communication device is one of multiple peripheral network nodes associated with a master network node in a hierarchical communication network, and each of the peripheral network nodes is configured to communicate its wireless messages to the master network node.

11. The wireless communication device of claim 10, wherein each of the peripheral network nodes is configured to collect data characterizing its ambient environment, process the respective collected data to generate a respective set of one or more statistics, and transmit the respective sets of one or more statistics to the master network node; and the master network node is configured to combine the respective sets of one or more statistics to generate one or more combined statistics.

12. The wireless communication device of claim 10, wherein the master network node is one of multiple master network nodes associated with a designated master network node at a higher level in the hierarchical communication network, and each of the multiple master network nodes is configured to communicate its wireless messages to the designated master network node at the higher level in the hierarchical communication network.

13. A wireless communication method, comprising:
responsive to an event, waking a one-time wake circuit of a wireless communication device comprising and antenna, a wireless communication system, and energy source;
responsive to the waking, creating a persistent electrical connection between the energy source and each of the processor and the wireless communication system;
by the processor, executing programmatic code stored on at least one non-transitory processor readable medium component of the wireless communication device to perform operations comprising controlling the wireless communication system to communicate wireless messages with one or more other network nodes during respective communication windows specified in the processor readable medium.

14. The method of claim 13, wherein the event comprises breaking an electrical connection to drive a voltage applied to the input of the one-time wake circuit above a turn-on voltage level for the one-time wake circuit.

15. A method of creating a hierarchical communications network, comprising:
adhering a first tape node to a first parcel in a set of associated parcels, the first tape node including a first type of wireless communication interface and a second type of wireless communication interface having a longer range than the first type of wireless communication interface;
adhering a second tape node to a second parcel in the set, the second tape node including the first type of wireless communication interface, wherein the second tape node is operable to communicate with the first tape node over a wireless communication connection established between the first type of wireless communication interfaces of the first and second tape nodes; and
establishing, by an application executing on a computer system, a wireless communication connection with the second type of wireless communication interface of the first tape node, and transmitting, by the application, programmatic code executable by the first tape node to function as a master tape node with respect to the second tape node.

16. The method of claim 15, further comprising, by the application: instructing the first and second tape nodes to report their current respective battery levels; and determining whether to designate the second tape node as a master tape node of the first tape node based on the reported current respective battery levels.

17. The method of claim 16, wherein the application designates the second tape node as the master tape node based on a determination that the current battery level of the first tape node is below a threshold battery level.

18. The method of claim 16, wherein the application designates the second tape node as the master tape node based on a determination that the current battery level of the second tape node is higher than the current battery level of the first tape node.

19. The method of claim 16, further comprising by the application, transmitting programmatic code executable by the second tape node to detect and respond to an event, wherein an event comprises one or more of a consolidation event that involves one or more parcels being added to existing set of parcels and a split event that involves one or more parcels being removed from an existing set of parcels.

20. The method of claim 19, wherein, based on execution of the programmatic code by the second tape node, performing operations comprising transmitting a wireless communication to an address of a third tape node adhered to an associated parcel in the set, and alerting the application based on a failure of the second tape node to receive a responsive communication from the third tape node.

21. The method of claim 20, wherein the alerting comprises, by the second tape node, transmitting an alarm packet to the master tape node for transmission to the application.

22. The method of claim 16, further comprising designating, by the application, the first tape node as a master tape node with respect to a third tape node adhered to an associated parcel in the set.

23. The method of claim 22, wherein each of the second and third tape nodes comprises a respective sensor; and further comprising, by the second and third tape nodes, respectively collecting local parcel condition data and processing the collected local parcel condition data to produce respective processed parcel condition data sets.

24. The method of claim 23, wherein each of the respective processed parcel condition data sets comprises data values of a respective histogram.

25. The method of claim 23, further comprising, by the second and third tape nodes, transmitting the respective processed parcel condition data sets to the designated master tape node; and further comprising, by the designated master tape node, processing the processed parcel condition data sets to produce a combined processed data set.

26. The method of claim 25, wherein the combined processed parcel condition data sets comprises data values of a respective histogram.

27. A hierarchical communications network, comprising:
a first tape node adhered to a first parcel in a set of associated parcels, the first tape node including a first type of wireless communication interface and a second type of wireless communication interface having a longer range than the first type of wireless communication interface;

a second tape node adhered to a second parcel in the set, the second tape node including the first type of wireless communication interface, wherein the second tape node is operable to communicate with the first tape node over a wireless communication connection established between the first type of wireless communication interfaces of the first and second tape nodes; and a computer system operable to execute an application to perform functions comprising establishing a wireless communication connection with the second type of wireless communication interface of the first tape node, and designating, by the application, the first tape node as a master tape node with respect to the second tape node.

28. A method of creating a hierarchical communications network, comprising:

activating a first tape node and adhering it to a first parcel in a set of associated parcels, the first tape node comprising a first type of wireless communication interface and a second type of wireless communication interface having a longer range than the first type of wireless communication interface;

activating second and third tape nodes and respectively adhering them to second and third parcels in the set of associated parcels, the second and third tape nodes each comprising the first type of wireless communication interface and a respective sensor, wherein each of the second and third tape nodes is operable to communicate with the first tape node over a wireless communication connection established between the first type of wireless communication interfaces of the first, second, and third tape nodes;

by an application executing on a computer system, transmitting to each of the second and third tape node programmatic code for detecting and responding to an event.

29. The method of claim 28, wherein, based on the programmatic code, the second tape node performs operations comprising transmitting a wireless communication to an address of the third tape node, and alerting the application based on a failure of the second tape node to receive a responsive communication from the third tape node.

30. The method of claim 29, wherein the alerting comprises, by the second tape node, transmitting an alarm packet to the master tape node for transmission to the application.

31. The method of claim 28, further comprising transmitting, by the application, programmatic code instructing the second and third tape nodes to perform operations comprising using their respective sensors to collect local parcel condition data and processing the collected local parcel condition data to produce respective processed parcel condition data sets.

32. The method of claim 31, further comprising transmitting, by the application, programmatic code enabling the first tape node to perform operations comprising functioning as a master tape node of the second and third tape nodes, and processing the processed parcel condition data sets to produce combined processed parcel condition data set.

33. The method of claim 32, wherein the aggregated processed parcel condition data sets comprise data values of a respective histogram.

Additional Embodiment 5—Infrastructure for Autonomous Intelligent Tape Agents

Low cost locationing/gateway infrastructure for connecting tape to cloud.

Mobile trucker hub. Mobile vehicle/unit equipped with wireless gateway for communicating with tape agents. Connects tape agents with cloud when mobile unit visit a product/materials storage facility (e.g., customs, shipping ports, warehouses, factories). Measure mobile and/or stationary tags. Tag is the master (not the infrastructure; tag looks for slave that can communicate for it).

Mobile client of human operator. Operator device running Trackonomy application. Application can run in background to connect any nearby tape to cloud. Other functions: associate tape with phone; picture of package; agreement on unique identifier transmitted to the cloud; bill of lading—digital interpretation of the bill of lading; verification procedure for packages (e.g., unknown boxes). Secure log in.

User experience flow for activation and verification termination. Show what the app would look like. Hold phone. Based on RSSI know proximity. Asks you to make a photo of the bill of lading. OCR to input the digitally QR code. Termination—gone out of system; success, not success; manual inspection; photo of what was received; signature.

Other infrastructure options: Install antenna on roof of storage facility; Dedicated gateways.

Tape agent implemented infrastructure functionality. Tape agent as gateway for master tape agents. Tape agents as locationing beacons. Installed throughout facility (e.g., multi-level warehouse, every level).

Tape agents for tracking state of facilities and mobile entities (e.g., forklift, doors, shipping container, gatekeeper for faraday cage, secure rooms, smart manufacturing)

Hierarchy of tape agents. Example—there is separate tape on pallet cluster, and each package in the cluster has its own tape. Hierarchy of traffic agents. If fully under control of cluster, can turn off tapes on individual packages only need to determine when the tapes are not longer part of the cluster anymore by pallet tape, which only needs to determine when box is not part of cluster; one master. Clusters talk to one another for the purpose of determining splits and consolidations, not for tracking. Topmost protocol is master/slave. Master could be changing; adaptive protocol, if figure out all tapes are together, only need one tape on at a time where the master can switch from one tape to another; if master detects something, use shock sensor to turn on accelerometer to see if something is moving.

Additional Embodiment 6—Dynamic Network of Autonomous Intelligent Tape Agents

Networking using LORA. Serial network. All gets logged, but cannot read it out whenever you want; in order to send/receive data need to wait until in environment that enables connection to cloud. Tape agent on package is master, package says I'm in region of stationary antenna, tape specifies what operations to perform; tape agent on package controls flow of information. Tape agent activation procedure: turn-on tape agent; cut tape sensor. Protocol to align timing/synchronize clocks of tape agents. Tape agents download schedule and configuration parameters for performing operations. Associate tape agents with centralized system. Schedule when tape agent turns on: when turn on reset time with cloud; misalignment skew (few seconds); how long to keep on to get alignment; agree on next time to communicate, align potential skew; have it on a long time vs. turn on for shorter time more frequently; put information in beacon. Schedule has constructs (e.g., when to wake up, how often to wake up, schedule for waking up, trigger points for waking, tape reports identity).

Alternatively, have a scanner that detects presence of gateway. No communication unless reader available to read. When reader says read, wake-up radio. Wake up app, wakeup all tapes within vicinity. Solve problem of having to coordinate turn on of all devices. Avoids issues of skew and turning on fixed schedule which risks wasting battery life.

Tape agent wakeup upon receipt of RF frequencies. Security feature; secure way to wake up; complete security check before sending out any information. The tape is in control, figures out when it's near hub geo-fences, and then starts mass transmit.

Additional Embodiment 7—Preventative Logistics

Configuration Environment in which you can map out your supply chain and partners, and drag and drop boxes and pallets; once you have that description, the system compiles and splits out codes to all the different tapes; delegates overall objective to all the individual traffic agents either at package-level or pallet-level or container-level.

Tape agents act as traffic agents that detect violations, then go into very deep sleep mode. Localized context-sensitive checks.

Download checks/violations for triggering alarms. Supply chain rules. API for all things that can go wrong (e.g., dropped package, outside temperature range, incorrect splits). Implied notion—measuring progress against the plan; knowledge of plan.

Tapes log everything (e.g., capture splits and consolidations). Example violations: boxes that need to be together. We have an encoding system that tells you which tape agents are allowed to be in your cluster. When associate an ID to the tape, you can have indications of who can be your associate. Looking at other packages, when removed when shouldn't be moved (alarm). Acceleration about threshold (dropped), stop shipment; "traffic agents" inside packages signal environment not to ship.

Detecting splits and consolidations. Mobile and stationary devices still form a network. Truck has list of things it should have as truck is being loaded (e.g., detect when item not on list is loaded and detect when item supposed to have is missing). Look at drop in RSSI and look at accelerometers not fully aligned any more. If packages on same pallet, should have same acceleration profile; if not, lost one or more. Also should have same RSSI signal strength, if drop in RSSI might have lost one. Algorithm: for loading/unloading, look at RSSI; see drop in strength in one or more tapes.

Continuous intelligence: protect box; prevent wrong splits/consolidations; prevent wrong loading/unloading; Need to know the logistics plan.

Box specific violations downloaded (instead of constantly checking). Can download parts of the plan. E.g., allowed to split/merge within these parameters. Checks: make sure pallet owned by you; if your pallet, these are the ones going to particular geography, shocks, drops.

Smart pallets. Not pallet itself because it is swapped out multiple times during shipment; focus on collection of boxes as unit, not pallet.

Alarm—box starts buzzing the moment you split or consolidate it in a cluster that is in violation with the overall shipment plan (or you get a text message telling you what to do).

Additional Embodiment 8—Consumable RFID Reader

Master tape agent configured to poll nearby tape agents configured with active RFID tags that are powered by external power source (e.g., RF hub). Master tape agent logs inventory. Master tape detects protocol violations.

Additional Embodiment 9—Scheduling

Container with cellphone: Cellphone-to-LORA+LORA-to-BLE+BLE-to-RFID

This whole hierarchy reduces cost. Optimize for hierarchical packaging (ship-container-pallet-box). Want to track lowest abstraction level. Minimize cost from BOM and monthly service costs. Multi-radio system.

Network protocol, scheduling (battery powered; need to turn-on/off), runtime operating system. Some communicators only communicate in one direction or only in broadcast mode.

CELL-LORA+LORA-

Broadcast mode LORA talks to all boxes, alternatively direct communication to a particular box. LORA single channel. Broadcast to all—>protocol: each node waits an arbitrary amount of time before transmitting/receiving signal; heartbeat: once per hour check-in. Two approaches—scheduling description language—before do rollout, have a description of all the communication events that will be scheduled distributed across network; each node only sees what its responsible for. E.g., master tape for container, master tape for pallet, etc. BLEs are slaves. Each master will receive the GSDL portion that it is scoped for.

E.g., rule in global scheduling description language that say these two boxes need to stay together. They need to go to same destination. GSDL says that every five minutes or 1 hour check to make sure that the box is still there. Part of GSDL need to roll up all the statistics. This pallet collects the statistics of the details of its functioning—e.g., how often are there shocks, histogram of different locations, vs. how often there were shocks greater than threshold across particular region. As you go up the grouping hierarchy, the data is merged with the data for the other groups at the same level. Do analytics in the cloud and at the distributed level. If only do it in cloud, we're only pure cloud players; if want to monetize fact that we can do software and hardware, we need to find value in doing analytics locally. Very battery constrained, limits ability to do everything in cloud: do everything at box level (communicate, e.g., histograms), combine box level to generate analytics at the pallet level, combine box level data to generate analytics at the container level, etc. to the cloud. Different brokers: A, B, C, . . . , F; how often temp violation happens, shock, splits, wrong consolidations, wrong loading/unloading.

All information has to bubble up to the cloud. Everyone cannot start communicating at the same time.

In the past GPS trackers do this with 3 million boxes and 500,000 pallets. Need dashboards and visualizations that fit the data measures. Made HW dirt-cheap. Software irrelevant. New state: truck contains packages, has a trucker hub, and communicates through LORA.

Hierarchy of communication is non-trivial. Instead of having cellular everywhere (too expensive), we need different layers.

Example: RFID→Bluetooth→LORA→Cellular

Practical setup: how do I communicate with what, at what point in time; how do we schedule; break it down with graph notation (arrow is direction of communication vs. broadcast mode); axes are communication events, the nodes are objects with sensor nodes (can be on a pallet, container, truck, forklift, door, light switch). Some nodes can only communicate in broadcast mode (e.g., LORA). Arrow represents direction of communication (use edge to indicate not a broadcast mode).

Need for different analytics—what that means when communicate it up is do analytics locally and then consolidate it as you move up the hierarchy. Pallet is smart enough to combine the histograms of the multiple boxes. Container smart enough to combine multiple pallets to generate analytics, etc.

Communication is very expensive. Need scheduling. Global scheduling description language—for all the nodes we specify what needs to happen at what point in time. Assume world is static: can say I want these two boxes on this pallet to check every two days to make sure the other box is still there; unless there is an acceleration event across an acceleration threshold (accelerometer) in which someone tries to move it then want to check up on acceleration threshold event. Not a program, this is a generic description language that has instructions (e.g., go communicate X on this trigger Y). Trigger can be every hour based on time frequency, based on temperature; thresholds can be based on GPS locations, lots of different triggers. Do not know a priori that someone is going to move the box, but can assume for this static scenario that pallet will always be in this container.

Will not send the entire description language to every node. Instead, will only send the respective portion of the description language that pertains to each particular node. Every container knows the elements/nodes of which it is the master; and only communicates lower in the hierarchy the scheduling description language that is relevant to that portion of the hierarchy. Only description language that gets transmitted by a particular master node is the portion relevant to the slaves below it.

Example: trucker hub can communicate with tapes on boxes. As soon as trucker hub comes by, need to wake them up if want to scan what's going on. Triggers: location, acceleration, temperature, or wakeup signal (another am wave that hits the tape). Can be a scheduled event. Global Scheduling Description Language (e.g., between 1 and 4 pm, ping every thirty minutes because we know truck is going to be there during that time.

The other approach: TCPIP—all the different nodes have a forwarding table that knows how to address things to certain areas. The graph (including dotted ones) is stored on every node—acts like a router. Give an instruction to this box (which has an address) you give it an instruction to measure temperature; forwarding table says this box is on this pallet, this box receives it, does its thing, sends packets back. Every node has a bunch of services that it offers to the overall system, and one service is just a communication service. Someone sends me packets, I don't know that the contents are, I don't care; I will just forward the packets along path to the destination.

Eventually received by point in the hierarchy that knows what to do with the packet and processes it. Need to store forwarding table everywhere.

Hybrid: generic description language—forward to relevant nodes, distributed analytics; TCPIP more robust. Three layers: (1) physical embodiment—HW pieces that communicate with one another; (2) firmware—operating system, how communication events really happen in way that minimizes power; (3) given supply chain, where do I put my nodes (supply chain with factory here, have a truck, a boat, test something here and it goes back—flow of parts— put node here to figure out if door is open or closed; put node on truck to figure out where it is, put one on pallet, put one on board, etc.

You can put cellular radio tape on truck, but put lower cost tape on box. Hierarchy of communication must match physical hierarchy of logistics. Consideration: how many units are covered, how expensive are the units, what infrastructure pieces do the units see. Solving that problem— whole new user interface environment; drag and drop box; model logistics problem, then press button, thing rolls out—optimize where you go; modeling and then deployment; app on phone: operators (not trained) instructed by app to place green tape on this wall; also consider maintenance—check if tape still has power or replace.

Levels: model supply chain; figure out optimum partitioning; rollout of having services at different places; firmware of making the whole thing tick. Optimize that diagram based on your supply chain requirements; and optimize cost of tapes based on actual products being protected; not just colors, it is also statistical weighting factor (e.g., every tape has tracker/sensor, or sampling tape). Where do I put the nodes; what color are the nodes; what sampling rate/strength is it (1 out of 10 or 1 out of 5); what battery life, range of communication.

On top of this is sampling rate (e.g., want to sample this node every hour)—dictates amount of battery; range of Trackonomy products, what color do I grab (10% sampling or 100% sampling).

Power harvesting (e.g., solar cells). Mechanism for harvesting (solar cells, vibrations, etc.); scheduling transmission of measurement. Measurement one time; one-time read. Part of scheduling framework. One-time read tags. Use models. Sampling rates; E&M harvesting for sensors.

Hierarchy of communication types; what does hierarchy mean in terms of network protocol, the scheduling, the runtime operating system, heartbeats of measuring; let's say cellular is expensive link, maybe heartbeat of every hour to send something; if I'm a box I need to be aware of that; if I want to send something to the cloud, I am the master of the universe, I know there is a service that is available to help transmit data to the cloud; I know that a signal will be available to receive my transmission in one hour; window to transmitting data is limited. Not just hierarchy; BLE tags all communicate with each other, some may see each other, others might not see others.

Graphical notation makes things simpler; how communications should flow; generic clauses: two ends of spectrum—either scheduling description language vs. TCPIP (need forwarding tables, all nodes need to know whole network); we have a very dynamic system (e.g., truck driving by warehouse to scan boxes at certain times; we will know the schedules). TCPIP is too generic, does not leverage what we know. Check container once per day; check pallet once per hour; . . . .

Scheduling description language: communicate every two hours; give that instruction to my container; another scheduling instruction: synchronize clocks/reset clocks (local area—e.g., Oakland port).

Inherent hierarchy; every node needs to decide what is affected by the lower abstraction levels; we know some schedules, also need some notion of forwarding where the pallet know which boxes it is the master of. Pallet can say these are my boxes; container can say these are my pallets.

TCPIP addressing scheme: {box}, {pallet}, {container}, {mobile (truck, ship, airplane)}, {stationary network}, {dynamic network—e.g., truck that drives by on schedule or arbitrary}). Really should say {type of thing, ID}. THING (type of thing, ID). Thing: box, forklift, light switch, etc. Post duct tape on thing want to monitor. Dynamic IP address (move box to another pallet). On top of this, this world is more scheduled than internet; scheduling description language.

Send measurement if triggered (GPS, shock, temperature, time (duration, frequency) Measurement can be GPS, temperature, other boxes detected.

Send scheduling description language (SDL) to slave nodes; send measurement of thing (send me temperature of box 156 if GPS is near the harbor). Send SDL, box 536 is in this container in this port, so all the slaves that are affected by this keep it in your memory, hierarchical recursive propagation, master of a bunch of subordinate slaves. Who is affected by this particular thing ID, this box says.

Another instruction: create histogram of certain measurement of a thing which is triggered; call instruction multiple times; locally stored.

Type: door, box, forklift, light switch (whatever needs to be measured/detected)

When receive overall address of a "thing" also know dynamic IP address—e.g., move box to a different pallet, address changes.

Put duct tape at location of strategic event. TCPIP thinking, when I get overall address of a thing, I also know what pallet I'm addressing.

Scheduling description language: send measurement if triggered (GPS, shock, temperature, time (duration, frequency), other boxes detected.

Another instruction: send scheduling description language to slave, e.g., send measurement of thing (temperature of box 1567 if within x GPS coordinates of port y). Send SDL: box 1567 is in this container, at this port, so all slaves that are affected by this keep it in your memory. Hierarchical recursive propagation. I'm master of other slaves; who's affected by this particular ID? These boxes are mine.

Another instruction: create a histogram of certain measurement of a thing; instead of a single measurement, call for transmission of measurement from multiple slave nodes. Aggregate data. Send analytical results.

Implementation: control block with memory, analytics (e.g., histogram); sensors to do measurements; trigger logic to interpret things; storage (sensor data, SDL, forwarding table/graph—each node needs to know its slaves in order to play a role in the operation of the system.

TCPIP (forwarding table) logic that knows how to communicate with the slaves and other nodes; SDL tell controller to do analysis of all the sensors that are slaves of it; e.g., do analysis of all temperature over period, measure every hour, show me histogram as a function of location; it knows all the slaves, and send instruction, break it up and send to all the boxes and then consolidate the result. generic description of a thing and its address; want to communicate with box 123, pallet 5 on container 2 it is connected to ship 1 and not opportunistic links. If I'm at a node and want to do something with box 123, I know pallet 5 is connected to me, send instruction to pallet 5, which will then talk with box 123. If don't have access to pallet 5, then will go to container 2, if that doesn't work go to ship 1, which will then go to container 2, pallet 5, then box 123. Then box 123 executes that instruction and communicates the results all the way up.

Scheduling description language: example instructions; send certain measurement (GPS, temp, other boxes detected in area) of a certain thing that has a unique ID at a certain trigger point; trigger can be GPS coordinates, certain distribution area, can be shock, time (duration, frequency); go one level up, store a histogram of all these measurements; of a certain thing and trigger; execution logic will understand that it needs to take measurement multiple times and aggregate. Store histogram. Another instruction: send stored histogram up the network. Execute to combine histograms, also need to send the data on which the histogram is based in order to combine the multiple histograms. Need to look at all analytics people want to do, histograms is just one. Break it down locally so don't have to communicate everything upward (e.g., include number of data points, high, low values (range), etc.). Consider sampling to determine analytics.

One instruction is <send>, is <do>, <store>. Sending is expensive. Instruction set: store measurement every hour; send once per day or when in port with low cost way of obtaining measurement data (e.g., at warehouse).

This system is applicable to all applications. Sampling on cellular (10%—1 out of 10 cones have communications; heartbeat every 30 minutes), rest are Bluetooth. Tell me how many cars pass by detector once per day (continuous monitoring). General description language to control how system operates, need modeling environment to create this. Need generic description to capture requirements, click on a button to cause the system to generate the program code (scheduling description language). Every node will need to have a unique identifier. Smart building. Measuring events. Intersection of smart world with people doing activities. People open doors etc. Perform optimization of those activities. People enter, leave, turn on computer, turn on lights. When car is parked/leaves, when box enters certain section, when boxes see other boxes.

Additional Embodiment 10—Parallel Non-communicating Block Chains of Independent Clusters of Transactions 1. A computer-based method, comprising:
accessing, by a processor, data from a data file comprising blocks and transactions data accessible by one or more computing devices sharing a blockchain protocol based system, wherein the transaction data is stored in a blockchain and the blocks contain times and sequences of transactions that are recorded into the blockchain;
responsive to a request to include data associated with one or more transactions in a block of the blockchain, building graphs of transactions among tapes and edges that define dependencies between the transactions, wherein the building comprises identifying nodes corresponding to clusters of tapes that are determined to be independent based on the graphs of transactions, wherein each tape is a type of wireless communications device that is flexible and adhesive;
executing independent tasks associated with independent clusters of tapes in parallel; and
incorporating results of the executing into a block of the block chain.

2. The method of claim 1, wherein the identifying comprises using a graph algorithm to identify the independent clusters of tapes.

3. The method of claim 1, wherein each cluster comprises at least a threshold number of nodes.

Other embodiments are within the scope of the claims.

The invention claimed is:

1. A method of creating a communications network, comprising:
adhering a first tape node to a first parcel in a set of associated parcels, the first tape node including a first type of wireless communication interface and a second type of wireless communication interface having a longer range than the first type of wireless communication interface;
adhering a second tape node to a second parcel in the set, the second tape node including the first type of wireless communication interface, wherein the second tape node is operable to communicate with the first tape node over a wireless communication connection established between the first type of wireless communication interfaces of the first and second tape nodes; and establishing, by a server, a wireless communication connection with the second type of wireless communication interface of the first tape node, and transmitting to the first tape node, by the server, programmatic code executable by the first tape node to function as a master tape node with respect to the second tape node.

2. The method of claim 1, further comprising, by the first tape node: instructing the first and second tape nodes to report their current respective battery levels; and determining whether to designate the second tape node as a master tape node of the first tape node based on the reported current respective battery levels.

3. The method of claim 2, further comprising, by the first tape node, designating the second tape node as the master tape node based on a determination that the current battery level of the first tape node is below a threshold battery level.

4. The method of claim 2, further comprising, by the first tape node, designating the second tape node as the master tape node based on a determination that the current battery level of the second tape node is higher than the current battery level of the first tape node.

5. The method of claim 1, further comprising, by the server system, transmitting programmatic code executable by the second tape node to detect and respond to an event.

6. The method of claim 5, wherein, based on execution of the programmatic code by the second tape node, performing operations comprising transmitting a wireless communication to an address of a third tape node adhered to an associated parcel in the set, and alerting the master tape node based on a failure of the second tape node to receive a responsive communication from the third tape node.

7. The method of claim 6, wherein the alerting comprises, by the second tape node, transmitting an alarm packet to the master tape node.

8. The method of claim 1, further comprising designating, by the second tape node, the first tape node as a master tape node with respect to a third tape node adhered to an associated parcel in the set.

9. The method of claim 8, wherein each of the second and third tape nodes comprises a respective sensor; and further comprising, by the second and third tape nodes, respectively collecting local parcel condition data and processing the collected local parcel condition data to produce respective processed parcel condition data sets.

10. The method of claim 9, wherein each of the respective processed parcel condition data sets comprises data values of a respective histogram.

11. The method of claim 9, further comprising, by the second and third tape nodes, transmitting the respective processed parcel condition data sets to the designated master tape node; and further comprising, by the designated master tape node, processing the processed parcel condition data sets to produce a combined processed data set.

12. The method of claim 11, wherein the combined processed parcel condition data sets comprises data values of a respective histogram.

13. A communications network, comprising:
a first tape node adhered to a first parcel in a set of associated parcels, the first tape node including a first type of wireless communication interface and a second type of wireless communication interface having a longer range than the first type of wireless communication interface;

a second tape node adhered to a second parcel in the set, the second tape node including the first type of wireless communication interface, wherein the second tape node is operable to communicate with the first tape node over a wireless communication connection established between the first type of wireless communication interfaces of the first and second tape nodes; and wherein the first tape node is a designated master tape node with respect to the second tape node and the first tape node is operable to transmit programmatic code to configure the second tape node as a master node with respect to the first tape node.

14. A method of creating a hierarchical communications network, comprising:

activating a first tape node and adhering the first tape node to a first parcel in a set of associated parcels, the first tape node comprising a first type of wireless communication interface and a second type of wireless communication interface having a longer range than the first type of wireless communication interface;

activating second and third tape nodes and respectively adhering them to second and third parcels in the set of associated parcels, the second and third tape nodes each comprising the first type of wireless communication interface and a respective sensor, wherein each of the second and third tape nodes is operable to communicate with the first tape node over a wireless communication connection established between the first type of wireless communication interfaces of the first, second, and third tape nodes;

by the first tape node, transmitting to each of the second and third tape nodes programmatic code for detecting and responding to an event.

15. The method of claim 14, wherein, based on the programmatic code, the second tape node performs operations comprising transmitting a wireless communication to an address of the third tape node, and alerting the first tape node based on a failure of the second tape node to receive a responsive communication from the third tape node.

16. The method of claim 15, wherein the alerting comprises, by the second tape node, transmitting an alarm packet to the first tape node.

17. The method of claim 14, further comprising transmitting, by the first tape node, programmatic code instructing the second and third tape nodes to perform operations comprising using their respective sensors to collect local parcel condition data and processing the collected local parcel condition data to produce respective processed parcel condition data sets.

18. The method of claim 17, further comprising transmitting, by the first tape node, programmatic code enabling the first tape node to perform operations comprising functioning as a master tape node of the second and third tape nodes, and processing the processed parcel condition data sets to produce aggregated processed parcel condition data set.

19. The method of claim 18, wherein the aggregated processed parcel condition data sets comprise data values of a respective histogram.

* * * * *